(12) United States Patent
Shima et al.

(10) Patent No.: US 11,383,487 B2
(45) Date of Patent: Jul. 12, 2022

(54) LAMINATED SUBSTRATE AND MANUFACTURING METHOD OF THE SAME

(71) Applicant: TOKIN CORPORATION, Sendai (JP)

(72) Inventors: Hiroshi Shima, Sendai (JP); Shun Mikoshiba, Sendai (JP); Kenichi Chatani, Sendai (JP)

(73) Assignee: TOKIN CORPORATION, Sendai (JP)

( * ) Notice: Subject to any disclaimer, the term of this patent is extended or adjusted under 35 U.S.C. 154(b) by 171 days.

(21) Appl. No.: 16/247,153

(22) Filed: Jan. 14, 2019

(65) Prior Publication Data
US 2019/0224943 A1    Jul. 25, 2019

(30) Foreign Application Priority Data

Jan. 23, 2018 (JP) .............................. JP2018-008723
Nov. 26, 2018 (JP) .............................. JP2018-220109

(51) Int. Cl.
*B32B 7/025* (2019.01)
*H01F 3/08* (2006.01)
(Continued)

(52) U.S. Cl.
CPC .............. *B32B 7/025* (2019.01); *H01F 1/26* (2013.01); *H01F 3/08* (2013.01); *H01F 27/255* (2013.01);
(Continued)

(58) Field of Classification Search
CPC ..... B32B 7/025; B32B 5/12; B32B 2260/021; B32B 2307/208; B32B 2260/046;
(Continued)

(56) References Cited

U.S. PATENT DOCUMENTS 3,731,005 A * 5/1973 Shearman ............... G11B 5/295
360/123.01
10,448,546 B1 * 10/2019 Yamada ................... H01F 41/26
(Continued)

FOREIGN PATENT DOCUMENTS

| JP | 2001126904 A | * | 5/2001 |
| JP | 2011129798 A | | 6/2011 |
| JP | 2015175047 A | | 10/2015 |

OTHER PUBLICATIONS

Flex-Suppressor: Noise suppression sheet, vol. 14, http://www1.futureelectronics.com/doc/TOKIN/E50-500X240T08.pdf (Year: 2008).*
(Continued)

*Primary Examiner* — Laura C Powers
*Assistant Examiner* — Rebecca L Grusby
(74) *Attorney, Agent, or Firm* — Holtz, Holtz & Volek PC

(57) ABSTRACT

A laminated substrate includes an upper prepreg cured body, a lower prepreg cured body and a magnetic member. The magnetic member is sandwiched between the upper prepreg cured body and the lower prepreg cured body in an up-down direction. The upper prepreg cured body is directly coupled to the lower prepreg cured body all over a predetermined area surrounding the magnetic member in a plane perpendicular to the up-down direction. The magnetic member is formed by binding soft magnetic metal powder using a binder. The soft magnetic metal powder consists of particles each of which has a flat shape. The binder comprises inorganic oxide as a chief ingredient. The magnetic member includes the soft magnetic metal powder of 60 vol. % or more and open pores of 10 vol. % or more and 30 vol. % or less. The magnetic member has a thickness of 0.3 mm or less.

4 Claims, 12 Drawing Sheets

(51) Int. Cl.
  *H01F 27/26* (2006.01)
  *H01F 27/255* (2006.01)
  *H01F 41/02* (2006.01)
  *H01F 1/26* (2006.01)

(52) U.S. Cl.
  CPC ....... *H01F 27/266* (2013.01); *H01F 41/0246* (2013.01); *B32B 2260/021* (2013.01); *B32B 2260/046* (2013.01); *B32B 2262/101* (2013.01); *B32B 2307/208* (2013.01)

(58) Field of Classification Search
  CPC .. B32B 5/022; B32B 5/26; B32B 3/08; B32B 2260/023; B32B 5/024; B32B 2262/101; B32B 2457/08; H01F 3/08; H01F 27/255; H01F 1/375; H01F 1/26; H01F 27/266; H01F 41/0266; H01F 1/12; H01F 1/20; H01F 1/22; H01F 1/24; H01F 41/0246; B29C 66/721; B29C 66/732; B29C 66/73941; Y10T 428/12493; Y10T 428/24322; Y10T 428/24612; B64C 2001/0072; B64C 2027/4736
  See application file for complete search history.

(56) References Cited

U.S. PATENT DOCUMENTS

| | | | | |
|---|---|---|---|---|
| 2002/0132898 | A1* | 9/2002 | Takaya | H01P 7/082 524/445 |
| 2006/0017435 | A1* | 1/2006 | Kang | G01R 33/04 324/249 |
| 2006/0110599 | A1* | 5/2006 | Honma | B29C 66/1122 428/413 |
| 2006/0154052 | A1* | 7/2006 | Waffenschmidt | H05K 1/165 428/339 |
| 2006/0290460 | A1* | 12/2006 | Waffenschmidt | H05K 1/165 336/223 |
| 2008/0268207 | A1* | 10/2008 | Ishigaki | B32B 7/02 428/172 |
| 2010/0143650 | A1* | 6/2010 | Tsai | B29C 66/712 428/139 |
| 2012/0256118 | A1 | 10/2012 | Nakamura | |
| 2015/0027771 | A1* | 1/2015 | Kagawa | B32B 27/20 174/350 |
| 2015/0235753 | A1* | 8/2015 | Chatani | H01F 27/255 336/200 |
| 2016/0007480 | A1* | 1/2016 | Yosui | H05K 3/4617 343/787 |
| 2016/0121554 | A1* | 5/2016 | Inoh | B29C 45/561 264/257 |
| 2017/0117081 | A1 | 4/2017 | Chatani et al. | |
| 2018/0040420 | A1* | 2/2018 | Poddar | H01F 41/046 |
| 2019/0035535 | A1* | 1/2019 | Furukawa | H02J 50/10 |

OTHER PUBLICATIONS

Machine Translation of JP 2001-126904 (Year: 2001).*
Amazon.com: PEEL Ultra Thin iPhone 12 Pro Case, Clear—Minimalist Design | Branding Free | Protects and Showcases Your Apple iPhone 12 Pro.*
Browne, Jack. "Should You Choose Hard or Soft PCB Materials?", https://www.mwrf.com/materials/article/21848764/should-you-choose-hard-or-soft-pcb-materials (Year: 2017).*

* cited by examiner

LAMINATED SUBSTRATE AND MANUFACTURING METHOD OF THE SAME

CROSS REFERENCE TO RELATED APPLICATIONS

This application is based on and claims priority under 35 U.S.C. § 119 to Japanese Patent Applications No. JP 2018-008723 filed Jan. 23, 2018 and No. JP 2018-220109 filed Nov. 26, 2018, the contents of which are incorporated herein in their entireties by reference.

BACKGROUND OF THE INVENTION

This invention relates to a laminated substrate including a magnetic member.

Those each of which includes a magnetic body inside a substrate have been proposed. For example, one of them is disclosed in JP 2011-129798A.

SUMMARY OF THE INVENTION

In industrialization of products using substrates, the substrates need ease of handling when used in addition to ease of transporting and ease of storage. For example, the substrates each of which has a plate shape must be manufactured separately for each size in use. Furthermore, manufactured substrates having various sizes must be transported and/or stored in a state that they are stacked one another. In contrast, a substrate having a roll shape can be cut in a required size to be used. Accordingly, there is no need to be particularly aware of the size in use when the substrate having the roll shape is transported and stored. That is, the substrate having the roll shape can be transported and stored as it is. Thus, when the industrialization is born in mind, it is preferable that a substrate can take a roll-shape form.

On the other hand, a magnetic body included in the substrate requires high magnetic characteristics comparable to those of ferrite when used to be arranged near a plane coil or when used as a material for a sheet-shape inductor. Here, the ferrite is unsuitable for being included in the substrate having the roll shape because it is hard and brittle. Although a composite magnetic sheet in which soft magnetic metal powder is bound by an organic binder has flexibility, it does not satisfy required conditions that it has, as magnetic characteristics, low loss and high magnetic permeability which are comparable to those of the ferrite.

Therefore, it is an object of the present invention to provide a substrate including a magnetic member having magnetic characteristics comparable to those of ferrite and having flexibility enough to take the roll-shape form.

In order to make possible to deliver a substrate in a state of a roll-shape form, it is preferable that a bending radius allowed for the substrate is 100 mm or less. Accordingly, each of a main member of the substrate and a magnetic member included therein must be a thing which can have a bending radius of 100 mm or less.

As a magnetic member having not a little flexibility, there is one proposed by the present applicant and disclosed in JP 2015-175047A. As a result of verifying relationship between thickness of this magnetic member and a bending radius, it has been found that the thickness of 0.3 mm or less allows the bending radius of 100 mm or less. However, it has been also found that the magnetic member crumbles from an end face(s) thereof when it is bent repeatedly. Accordingly, it is necessary to take measures of some kind for the end face(s) of the magnetic member.

As the main member of the substrate, there is a prepreg, for example. On putting the magnetic member between upper and lower prepregs and pressing and heating them, resins exuded from the upper and the lower prepregs are mixed and cured since the magnetic member is relatively thin. Thus, the upper and the lower prepregs can be directly connected to each other. Accordingly, there is no need of special processing for forming a cavity for accommodating the magnetic member in the substrate. Also, an additional frame member for holding the magnetic member is unnecessary. In addition, an end face(s) of the magnetic member is surrounded by the resins exuded from the upper and the lower prepregs and cured, and thereby the end face(s) of the magnetic member can be prevented from crumbling and falling out from the substrate.

The present invention is based on the findings mentioned above and provides a laminated substrate enumerated below and a manufacturing method thereof specifically.

One aspect of the present invention provides a laminated substrate which comprises an upper prepreg cured body, a lower prepreg cured body and a magnetic member. The magnetic member is sandwiched between the upper prepreg cured body and the lower prepreg cured body in an up-down direction. The upper prepreg cured body is directly coupled to the lower prepreg cured body all over a predetermined area surrounding the magnetic member in a plane perpendicular to the up-down direction. The magnetic member is formed by binding soft magnetic metal powder using a binder. The soft magnetic metal powder consists of particles each of which has a flat shape. The binder comprises inorganic oxide as a chief ingredient. The magnetic member includes the soft magnetic metal powder of 60 vol. % or more and open pores of 10 vol. % or more and 30 vol. % or less. The magnetic member has a thickness of 0.3 mm or less.

Another aspect of the present invention provides a method for manufacturing a laminated substrate. The method comprises: providing a lower prepreg which has a lower fibrous reinforcement base impregnated with a thermosetting resin composition; disposing a magnetic member in an area surrounded by a predetermined area on the lower prepreg, the magnetic member being formed by binding soft magnetic metal powder using a binder, the soft magnetic metal powder consisting of particles each of which has a flat shape, the binder comprising inorganic oxide as a chief ingredient, the magnetic member including the soft magnetic metal powder of 60 vol. % or more and open pores of 10 vol. % or more and 30 vol. % or less, the magnetic member having a thickness of 0.3 mm or less; providing a upper prepreg which has a upper fibrous reinforcement base impregnated with a thermosetting resin composition; laminating the upper prepreg on the lower prepreg to envelop the magnetic member; and pressing and heating the upper prepreg and the lower prepreg to fill the thermosetting resin composition of the upper prepreg and the thermosetting resin composition of the lower prepreg into between the upper fibrous reinforcement base and the lower fibrous reinforcement base and to cure the thermosetting resin compositions in the predetermined area, and thereby coupling the upper prepreg and the lower prepreg to each other directly all over the predetermined area.

The magnetic member included in the laminated substrate of the present invention is formed by binding the soft magnetic metal powder using the binder. The soft magnetic metal powder consists of particles each of which has a flat shape. The binder has inorganic oxide as the chief ingredient. The magnetic member includes the soft magnetic metal powder of 60 vol. % or more and open pores of 10 vol. % or more and 30 vol. % or less. Hence, the magnetic member has magnetic characteristics comparable to those of ferrite. In addition, the magnetic member has the thickness of 0.3 mm or less. Because of this, the magnetic member can achieve a bending radius of 100 mm or less.

The magnetic member like this is sandwiched by the upper prepreg and the lower prepreg to be packed. In detail, the upper prepreg is directly coupled to the lower prepreg all over the predetermined area surrounding the magnetic member in the plane perpendicular to the up-down direction. Accordingly, there is no need to form a cavity for accommodating and holding the magnetic member in the substrate. Also, there is no need to provide an additional frame member or the like for holding the magnetic member. Furthermore, since end faces of the magnetic member are not exposed, the end faces of the magnetic member can be prevented from crumbling and falling out from the substrate.

In the predetermined area, the thermosetting resin composition of the upper prepreg and the thermosetting resin composition of the lower prepreg are filled into between the upper fibrous reinforcement base and the lower fibrous reinforcement base and cured. Accordingly, irregularities based on the thickness of the magnetic member hardly appear on a surface of the whole of the laminated substrate. Therefore, according to the present invention, the laminated substrate which is flat and easy to handle can be obtained. In addition, the laminated substrate obtained has flexibility enough to take a roll-shape form.

An appreciation of the objectives of the present invention and a more complete understanding of its structure may be had by studying the following description of the preferred embodiment and by referring to the accompanying drawings.

Figure 1:
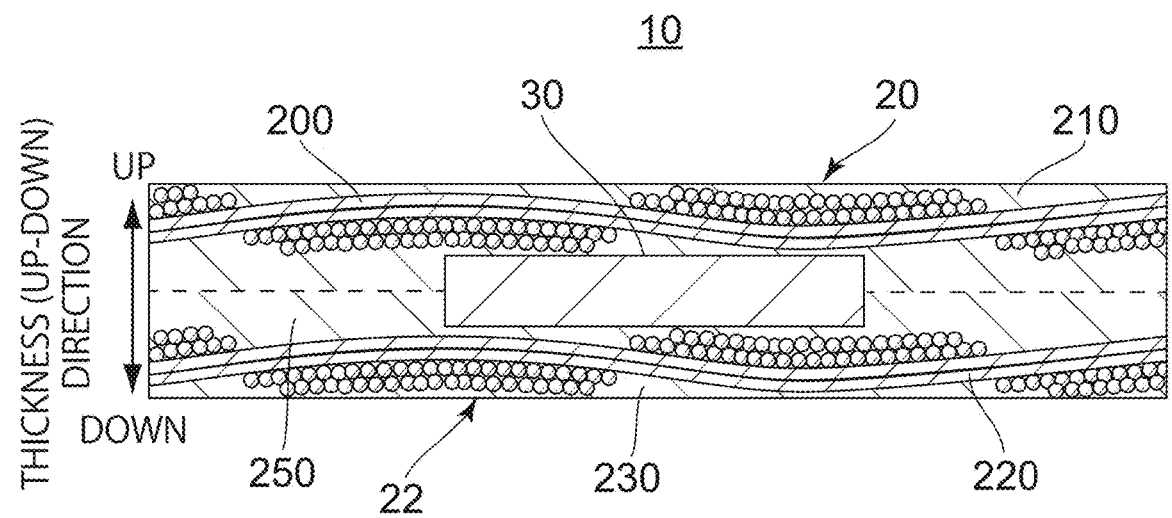
FIG. 1 is a cross-sectional view showing schematically a structure of a laminated substrate according to a first embodiment of the present invention. Fiber glasses forming a glass woven fabric are drawn relatively large.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DESCRIPTION OF PREFERRED EMBODIMENTS

First Embodiment

Referring to FIG. 1, a laminated substrate 10 according to a first embodiment of the present invention is provided with an upper prepreg cured body 20, a lower prepreg cured body 22 and a magnetic member 30. It should be noted that terms of "upper" and "lower" in the present description are decided for convenience. They do not mean "upper" and "lower" in a direction of the plumb line but merely mean "upper" and "lower" in an up-down direction (laminating or thickness direction) of FIG. 1.

The upper prepreg cured body 20 and the lower prepreg cured body 22 have the same structure substantially. In detail, the upper prepreg cured body 20 has, as shown in FIG. 1, an upper fibrous reinforcement base 200 impregnated with a thermosetting resin composition 210. Similarly, the lower prepreg cured body 22 has a lower fibrous reinforcement base 220 impregnated with a thermosetting resin composition 230. In the present embodiment, each of the upper fibrous reinforcement base 200 and the lower fibrous reinforcement base 220 consists of glass woven fabric. The thermosetting resin compositions 210 and 230 include epoxy resin as a chief ingredient. However, the present invention is not limited thereto. Each of the upper fibrous reinforcement base 200 and the lower fibrous reinforcement base 220 may consist of glass nonwoven fabric. Alternatively, each of the upper fibrous reinforcement base 200 and the lower fibrous reinforcement base 220 may consist of woven fabric or nonwoven fabric made of a material(s) other than glass.

As shown in FIG. 1, the magnetic member 30 is sandwiched between the upper prepreg cured body 20 and the lower prepreg cured body 22 in the up-down direction. The upper prepreg cured body 20 is directly coupled to the lower prepreg cured body 22 all over a predetermined area 250 (see FIG. 6) surrounding the magnetic member 30 in a plane perpendicular to the up-down direction. In detail, the upper prepreg cured body 20 and the lower prepreg cured body 22 are directly coupled to each other by the thermosetting resin compositions 210 and 230 exuded from the upper fibrous reinforcement base 200 and the lower fibrous reinforcement base 220. The thermosetting resin compositions 210 and 230 exuded from the upper fibrous reinforcement base 200 and the lower fibrous reinforcement base 220 surround the magnetic member 30 in the plane perpendicular to the up-down direction. Thus, the magnetic member 30 is enveloped in a prepreg cured body formed by the upper prepreg cured body 20 and the lower prepreg cured body 22.

Figure 2:
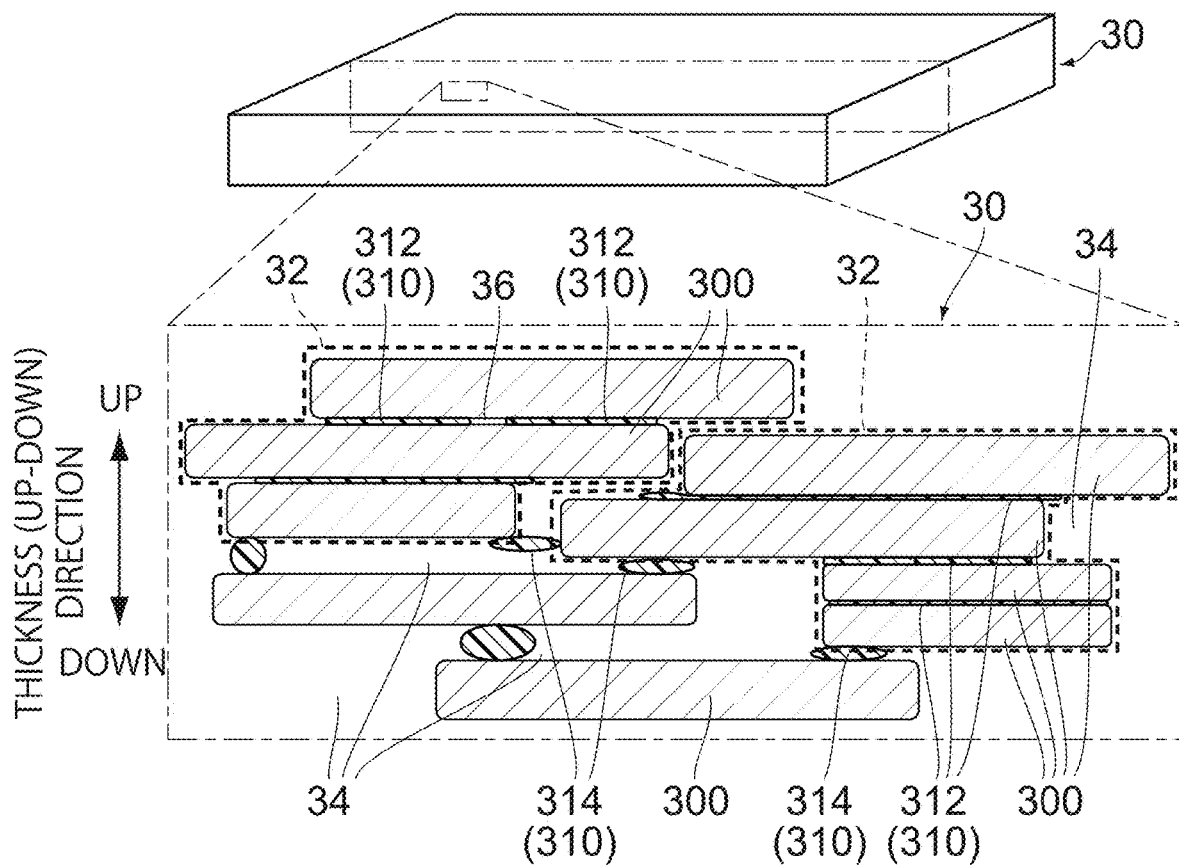
FIG. 2 is a perspective view showing schematically a magnetic member included in the laminated substrate of FIG. 1. A part of a section of the magnetic member is enlarged and drawn schematically, wherein the part is enclosed in a box of a dashed line.

Referring to FIG. 2, the magnetic member 30 has a shape of a rectangular flat plate which is thin in the up-down direction. In other words, the magnetic member 30 has a sheet shape having a predetermined thickness. However, the present invention is not limited thereto. The magnetic member 30 may have any one of various shapes other than a rectangle.

In the present embodiment, the thickness of the magnetic member 30 is 0.3 mm or less. This value is based on test results carried out by the present inventors. The tests were carried out according to Japan Electronics and Information Technology Industries Association Standard JEITA ED-4702B for magnetic members having various thicknesses. In detail, samples were made by providing many magnetic members having various thicknesses, sandwiching each of the magnetic members by a pair of prepregs having a thickness of 100 μm from above and below and curing the prepregs. Then, mechanical stress resistance tests were carried out for the samples while test conditions were changed, wherein the test conditions include supporting span and push-in amount. These tests were made to find the hardest condition among conditions each of which satisfies that an incidence of cracks caused in the magnetic member is 0 among 100 samples. After that, each of the found conditions is converted into a winding radius (allowable winding radius) R which is obtained by winding (bending) the sample in a roll shape. The results are shown in FIG. 3.

Figure 3:
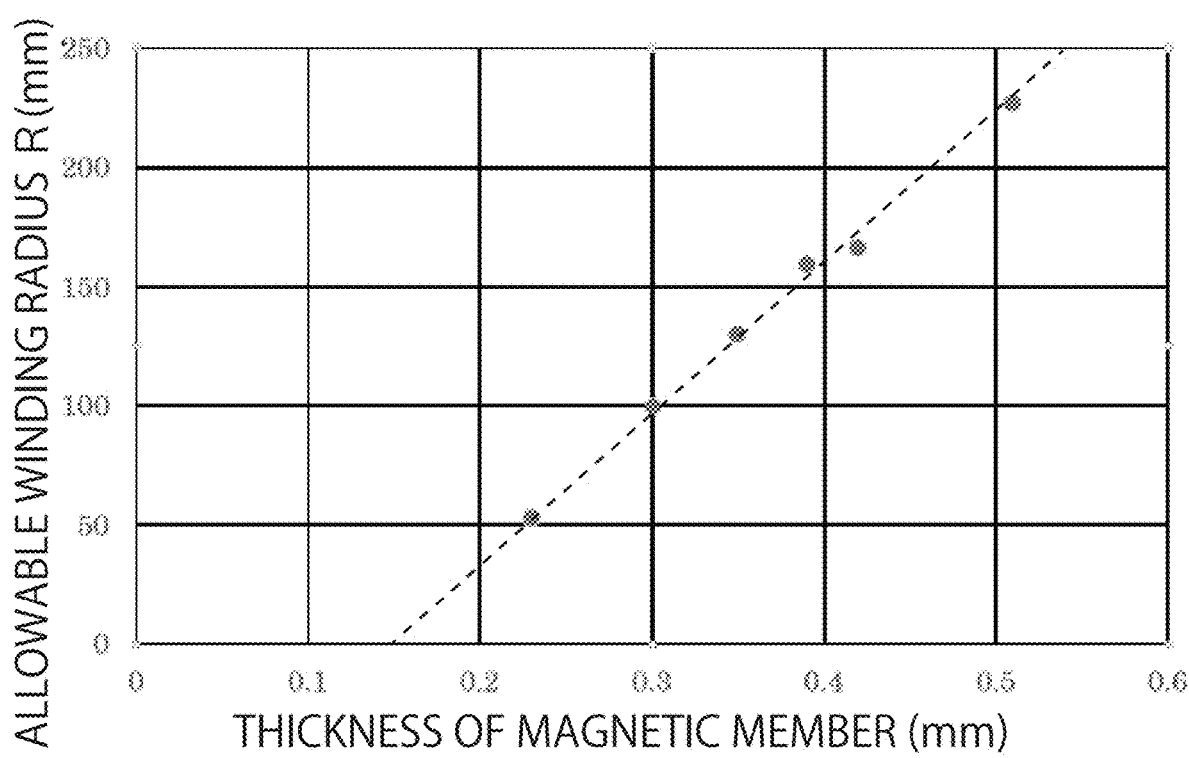
FIG. 3 is a graph showing a relationship between thicknesses of the magnetic member and allowable winding radiuses R.

As understood from FIG. 3, the allowable winding radius R decreases as the thickness of the magnetic member 30 is reduced. Here, in consideration of practicality, it is desirable that the winding radius (bending radius) R of the laminated substrate 10 which is wound in a roll shape is 100 mm or less. According to the test results shown in FIG. 3, when the thickness of the magnetic member 30 is 0.3 mm or less, the winding radius R of the laminated substrate 10 can be 100 mm or less without occurrence of cracks in the magnetic member 30. In particular, when the thickness of the magnetic member 30 is 0.15 mm or less, a crack does not appear in the magnetic member 30 even if the laminated substrate 10 is folded (the winding radius R is reduced to zero). Therefore, in the present embodiment, the thickness of the magnetic member 30 is set to 0.3 mm or less, preferably to 0.15 mm or less.

Referring to FIG. 2 again, the magnetic member 30 is formed by binding soft magnetic metal powder 300 using a binder 310. The soft magnetic metal powder 300 consists of particles each of which has a flat shape thin in the up-down direction. The particles are roughly oriented in a direction (in-plane direction) perpendicular to the up-down direction. The particles of the soft magnetic metal powder 300 have sizes which are not uniform but within a predetermined range. The magnetic member 30 includes the soft magnetic metal powder 300 of 60 vol. % and or more and open pores 34 of 10 vol. % or more and 30 vol. % or less. The magnetic member 30 further includes closed pores 36 of a few vol. %. The binder 310 has inorganic oxide, e.g. silicon oxide, as a chief ingredient.

As shown in FIG. 2, the soft magnetic metal powder 300 forms one or more powder aggregates 32. Each of the powder aggregates 32 includes a plurality of particles of the soft magnetic metal powder 300. In each of the powder aggregates 32, each of the particles of the soft magnetic metal powder 300 overlaps with at least one of other particles of the soft magnetic metal powder 300 in the up-down direction. In each of the powder aggregates 32, the particles of the soft magnetic metal powder 300 that are overlapped with each other are displaced from each other in the in-plane direction in many cases. In each of the powder aggregates 32, the particles of the soft magnetic metal powder 300 that are overlapped with each other in the up-down direction are bound by first binding bodies 312. The powder aggregates 32 adjacent to each other in the up-down direction are bound by second binding bodies 314. Also, the powder aggregates 32 adjacent to each other in the in-plane direction are bound by other second binding bodies 314. Each of the particles of the soft magnetic metal powder 300 that does not form the powder aggregate 32 is bound, by another second binding body 314, to the powder aggregate 32 adjacent thereto or another particle which does not form the powder aggregates 32. Here, the first binding bodies 312 and the second binding bodies 314 are binder components obtained by hot curing the binder 310. Each of the first binding bodies 312 spreads flat along a surface of the particle of the soft magnetic metal powder 300. Each of the second binding bodies 314 is solidified in a particle shape.

As understood from FIG. 2, each of the first binding bodies 312 is remarkably thin in comparison with the particle of the soft magnetic metal powder 300 in the up-down direction. Consequently, the particles of the soft magnetic metal powder 300 forming the powder aggregate 32 are gathered in high density. With this, the magnetic member 30 can include the soft magnetic metal powder 300 of 60 vol. % or more. On the other hand, each of the second binding bodies 314 has a relatively large size in each of the up-down direction and the in-plane direction. Hence, the second binding body 314 forms a relatively large gap between the powder aggregates 32 adjacent to each other. Alternatively, the second binding body 314 forms a relatively large gap between the particle of the soft magnetic metal powder 300 that does not form the powder aggregate 32 and another nearby one of the particles of the soft magnetic metal powder 300 or nearby one of the powder aggregates 32. Most of the gaps formed by the second binding bodies 314 form the open pores 34 which are opened outside the magnetic member 30. The remains of the gaps formed by the second binding bodies 314 form the closed pores 36 which are isolated individually. Existence of the open pores 34 and the closed pores 36 gives the magnetic member 30 flexibility. In order to obtain desired flexibility, a volume percent of the open pores 34 in the magnetic member 30 is set to 10 vol. % or more.

The magnetic member 30 includes, as mentioned above, the soft magnetic metal powder 300 of 60 vol. % or more. Consequently, the magnetic member 30 shows excellent magnetic characteristics. In detail, the magnetic member 30 has high saturation flux density of 0.5 T or more and high magnetic permeability comparable to that of ferrite. For example, at a frequency of 1 MHz or more, the magnetic member 30 has a real part of relative magnetic permeability of 100 or more. In order to obtain higher relative magnetic permeability of the magnetic member 30, the magnetic member 30 more preferably includes the soft magnetic metal powder 300 of 70 vol. % or more. In the magnetic member 30, the volume percentage of the open pores 34 is set to 30 vol. % or less so that the volume percentage of the soft magnetic metal powder 300 is set to 60 vol. % or more.

Each of the particles of the soft magnetic metal powder 300 has the flat shape and is oriented in the in-plane direction as mentioned above. Accordingly, the magnetic member 30 has an axis of easy magnetization that extends in the in-plane direction. In order to obtain a smaller demagnetizing coefficient of the in-plane direction and higher relative magnetic permeability of the magnetic member 30, a mean aspect ratio of the particles of the soft magnetic metal powder 300 is 10 or more preferably. Here, the mean aspect ratio represents a ratio of a mean long diameter of the particles of the soft magnetic metal powder 300 to a mean maximum thickness of the particles of the soft magnetic metal powder 300.

The soft magnetic metal powder 300 is made of Fe-based alloy preferably so as to obtain desired magnetic characteristics. In detail, the soft magnetic metal powder 300 is made of Fe—Si-based alloy preferably. In more detail, the soft magnetic metal powder 300 is made of Fe—Si—Al-based alloy (Sendust) or Fe—Si—Cr-based alloy preferably.

In a case where the soft magnetic metal powder 300 includes Si elements and Al elements, a ratio of the Si elements in the soft magnetic metal powder 300 is 3 weight % or more and 18 weight % or less preferably while a ratio of the Al elements in the soft magnetic metal powder 300 is 1 weight % or more and 12 weight % or less preferably. When the soft magnetic metal powder 300 has the composition mentioned above, the magnetic member 30 has a lower crystal magnetic anisotropic constant, a lower magnetostriction constant and excellent magnetic characteristics.

The magnetic member 30 has the flexibility as mentioned above. Accordingly, the magnetic member 30 is hard to be broken differently from the ferrite even when it receives a pressing force, and the magnetic characteristics thereof are hard to deteriorate. In addition, since the particles of the soft magnetic metal powder 300 are oriented in the direction perpendicular to the up-down direction, the magnetic member 30 is hard to be fractured in the up-down direction even when it is bent.

As mentioned above, the particles of the soft magnetic metal powder 300 are bound by the binder components 312 and 314 which are inorganic substances. Accordingly, the magnetic member 30 can be resistant to a high temperature of about 260 degrees Celsius used for reflow soldering. Moreover, the particles of the soft magnetic metal powder 300 are bound by the binder components 312 and 314 which have electric insulation. Accordingly, the magnetic member 30 has excellent frequency characteristics and high electric resistivity of 10 kΩcm or more. Thus, the magnetic member 30 has good electric insulation. In a case where the soft magnetic metal powder 300 includes predetermined amount of the Si elements and the Al elements, passivity films including Si elements and Al elements are formed on surfaces of particles of the soft magnetic metal powder 300 during a manufacturing process of the magnetic member 30. Accordingly, the magnetic member 30 has higher electric resistivity.

The binder components 312 and 314 included in the magnetic member 30 have a preferable range of a volume percentage, and the preferable range depends on density of the binder components 312 and 314. The density of the binder components 312 and 314 is varied according amount of the closed pores 36. For example, when the density of the binder components 312 and 314 is 1.3 g/cc or more and 2.2 g/cc or less, the preferable range of the volume percentage of the binder components 312 and 314 included in the magnetic member 30 is 4 vol. % or more and 30 vol. % or less. When the volume percentage of the binder components 312 and 314 is smaller than 4 vol. %, the magnetic member 30 does not have enough strength. When the volume percentage of the binder components 312 and 314 is larger than 30 vol. %, it is impossible to realize a state that the volume percentage of the soft magnetic metal powder 300 is 60 vol. % or more and the volume percentage of the open pores 34 is 10 vol. % or more.

The whole or a part of a surface of the magnetic member 30 may be coated by resin or glass. The resin may be isolative resin, such as acrylic resin, polyolefin resin or the like. With this, strength and electric insulation of the magnetic member 30 can be improved. Moreover, at least part of the open pores 34 opened outside the magnetic member 30 may be embedded by resin, glass or inorganic oxide. Because of this, the strength and the electric insulation of the magnetic member 30 are further improved.

Figure 4:
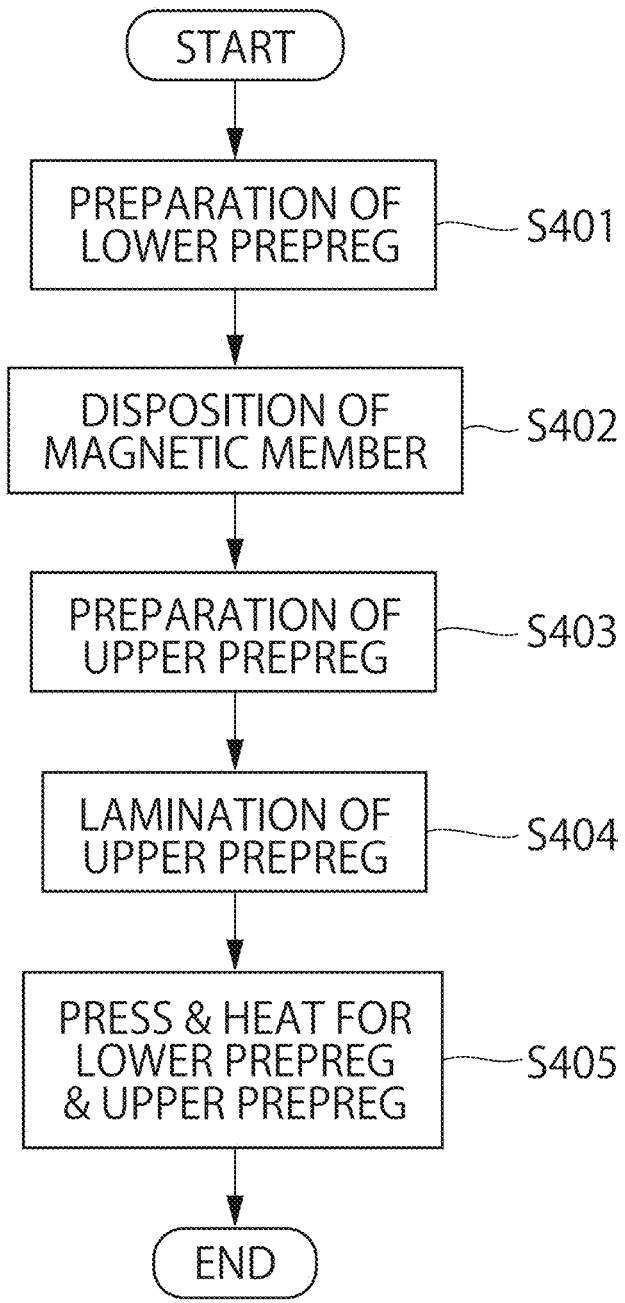
FIG. 4 is a flowchart for describing a manufacturing method of the laminated substrate of FIG. 1.
Figure 5:
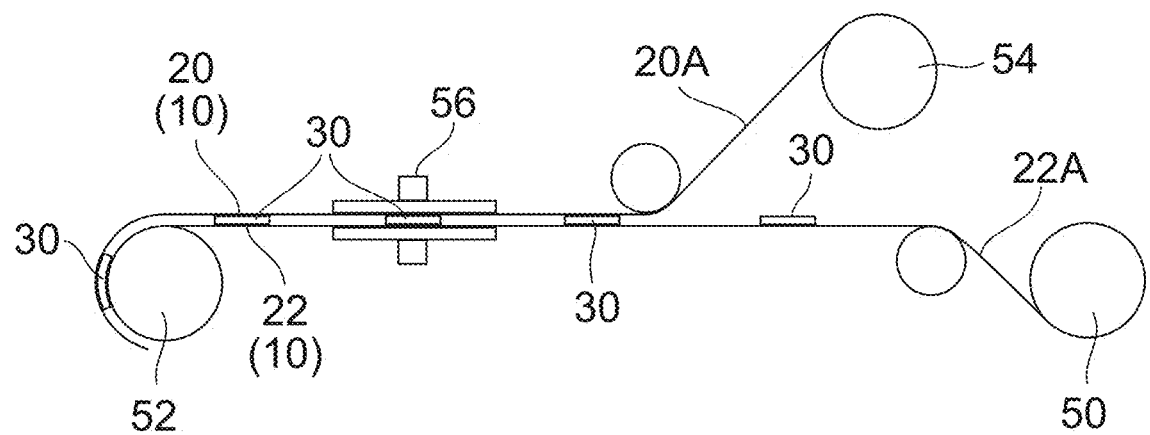
FIG. 5 is a schematic view showing an example of a manufacturing system to execute the manufacturing method of the laminated substrate of FIG. 4.
Figure 6:
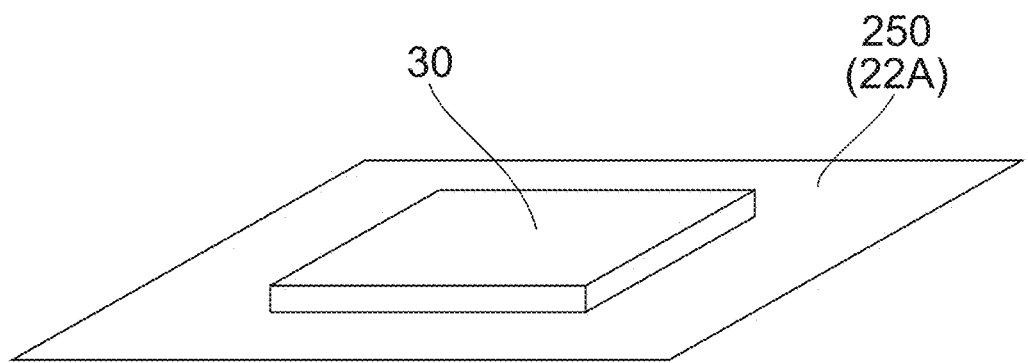
FIG. 6 is a perspective view showing one step in the middle of manufacturing the laminated substrate of FIG. 1. It shows a state that the magnetic member is disposed on a surface of a lower prepreg. A predetermined area is drawn relatively large.

Referring to FIGS. 4 to 6, a manufacturing method for manufacturing the laminated substrate 10 of FIG. 1 is described in the following.

First, a lower prepreg 22A is provided (Step S401). The lower prepreg 22A is changed into the lower prepreg cured body 22 by a pressing and heating process curried out later. In detail, the lower prepreg 22A has a sheet shape and includes the lower fibrous reinforcement base 220 (see FIG. 1) impregnated with the thermosetting resin composition 230 (see FIG. 1). A surface of the lower prepreg 22A is generally flat and not provided with an accommodating portion, such as a cavity or a frame body, for accommodating the magnetic member 30. The thermosetting resin composition 230 is in a half-cured state (stage B), and the lower prepreg 22A has flexibility. A thickness of the lower prepreg 22A and composition of the thermosetting resin composition 230 are selected to realize a predetermined bending radius R in a state that the lower prepreg 22A is changed into the lower prepreg cured body 22. For example, the thickness of the lower prepreg 22A is 100 μm or less. In the present embodiment, the lower prepreg 22A which is long and wound in a roll shape is used. However, the present invention is not limited thereto. For example, the lower prepreg 22A may have a size which can be handled in a flat state. In the present embodiment, a length of the lower prepreg 22A is remarkably longer than that of the magnetic member 30. A width of the lower prepreg 22A is sufficiently wider than that of the magnetic member 30. The surface of the lower prepreg 22A has extent enough to leave a predetermined area 250 having predetermined extent around the magnetic member 30 when the magnetic member 30 is put on the surface of the lower prepreg 22A. Here, the predetermined extent of the predetermined area 250 is large enough to obtain practically sufficient strength in a coupling portion between the upper prepreg cured body 20 and the lower prepreg cured body 22.

Next, the magnetic member 30 is disposed in the area surrounded by the predetermined area 250 on the surface of the lower prepreg 22A (Step S402). In a case of using the lower prepreg 22A having the roll shape, the lower prepreg 22A is set to a first feeder 50. Then, a plurality of the magnetic members 30 is disposed on the surface of the lower prepreg 22A one by one as the lower prepreg 22A is fed to a winder 52. The magnetic members 30 are arranged at regular intervals in a longitudinal direction of the lower prepreg 22A. The magnetic members 30 may be arranged in not only the longitudinal direction of the lower prepreg 22A at regular intervals but a width direction of the lower prepreg 22A at intervals. In other words, the magnetic members 30 may be arranged in a two-dimensional array on the surface of the lower prepreg 22A. At any rate, the magnetic members 30 are disposed so that the predetermined area 250 is left around each of the magnetic members 30.

Next, an upper prepreg 20A is provided (Step S403). The upper prepreg 20A is changed into the upper prepreg cured body 20 by the pressing and heating process curried out later. The upper prepreg 20A has the same structure as that of the lower prepreg 22A. That is, the upper prepreg 20A has the upper fibrous reinforcement base 200 (see FIG. 1) impregnated with the thermosetting resin composition 210 (see FIG. 1). A surface of the upper prepreg 20A is not provided with an accommodating portion, such as the cavity or the frame body, for accommodating the magnetic member 30 either. Moreover, the thermosetting resin composition 210 is in a half-cured state (stage B), and the upper prepreg 20A has sufficient flexibility. The upper prepreg 20A is also wound in a roll shape.

Next, the upper prepreg 20A is laminated on the lower prepreg 22A and the magnetic members 30 so that the magnetic members 30 are sandwiched between the lower prepreg 22A and the upper prepreg 20A (Step S404). This lamination can be carried out as the upper prepreg 20A set to a second feeder 54 is fed to the winder 52.

Next, the lower prepreg 22A and the upper prepreg 20A are heated over a temperature at which the thermosetting resin compositions 210 and 230 are cured while a pressure is applied to the lower prepreg 22A and the upper prepreg 20A from above and below (Step S405). Since the magnetic member 30 has the flexibility, the magnetic member 30 is not broken physically by the pressing. And the magnetic characteristics of the magnetic member 30 are not deteriorated. In the present embodiment, the pressing and heating is carried out by a pressing and heating device 56 before the upper prepreg 20A and the lower prepreg 22A are wound by the winder 52. However, the present invention is not limited thereto. The pressing and heating for the laminated body may be carried out by another device, such as an autoclave.

In the heating process, the thermosetting resin compositions 210 and 230 are temporarily fused and then cured (stage C). In the meantime, by influence of the pressing, the thermosetting resin compositions 210 and 230 which are fused flow into and fill between the upper fibrous reinforcement base 200 and the lower fibrous reinforcement base 220. The thermosetting resin compositions 210 and 230 filled between the upper fibrous reinforcement base 200 and the lower fibrous reinforcement base 220 are mixed with each other and unified so that a boundary therebetween disappear. While this state is maintained, the thermosetting resin compositions 210 and 230 are cured. Thus, the upper prepreg 20A and the lower prepreg 22A are respectively changed into the upper prepreg cured body 20 and the lower prepreg cured body 22. As a result, the upper prepreg cured body 20 and the lower prepreg cured body 22 are directly coupled with each other all over the predetermined area 250 to envelop the magnetic member 30. Then, the magnetic member 30 is surrounded by the upper prepreg cured body 20 and the lower prepreg cured body 22 without any gap.

In the manner mentioned above, the laminated substrate 10 is finished. In the laminated substrate 10, the thermosetting resin compositions 210 and 230 are filled between the upper fibrous reinforcement base 200 and the lower fibrous reinforcement base 220. Accordingly, irregularities based on the thickness of the magnetic member 30 hardly appear on the surface of the laminated substrate 10. In other words, the surface of the laminated substrate 10 manufactured is almost flat regardless of existence of the magnetic member 30.

The laminated substrate 10 finished is wound by the winder 52. In other words, the laminated substrate 10 according to the present embodiment has flexibility enough to allow it to have the roll-shape form. This is because the magnetic member 30 has the thickness of 0.3 mm or less and the flexibility enough to realize the roll-shape form. In the present embodiment, no clack is caused in the magnetic member 30 even when the laminated substrate 10 is wound to have the roll shape with a bending radius of 100 mm or less. In addition, the magnetic characteristics of the magnetic member 30 are not deteriorated.

In the laminated substrate 10 before it is wound by the winder 52, the magnetic member 30 is surrounded by the thermosetting resin compositions 210 and 230, which are exuded from the upper prepreg 20A and the lower prepreg 22A and cured, without any gap in the plane perpendicular to the up-down direction. End faces of the magnetic member 30 are covered with the thermosetting resin compositions 210 and 230 as shown in FIG. 1. Consequently, even when the laminated substrate 10 is wound and then unbent, the end faces of the magnetic member 30 do not crumble.

The laminated substrate 10 is unbent from the roll-shape form and cut in units of the magnetic members 30 when used. In cutting, the end faces of the magnetic member 30 are protected by leaving the predetermined area 250 around the magnetic member 30. The magnetic member 30 is used as a part of the laminated circuit board, for example.

In the manner mentioned above, according to the present embodiment, it is possible to obtain the laminated substrate 10 having an approximately uniform thickness that is capable of taking the roll-shape form and easy to handle.

Second Embodiment

Figure 7:
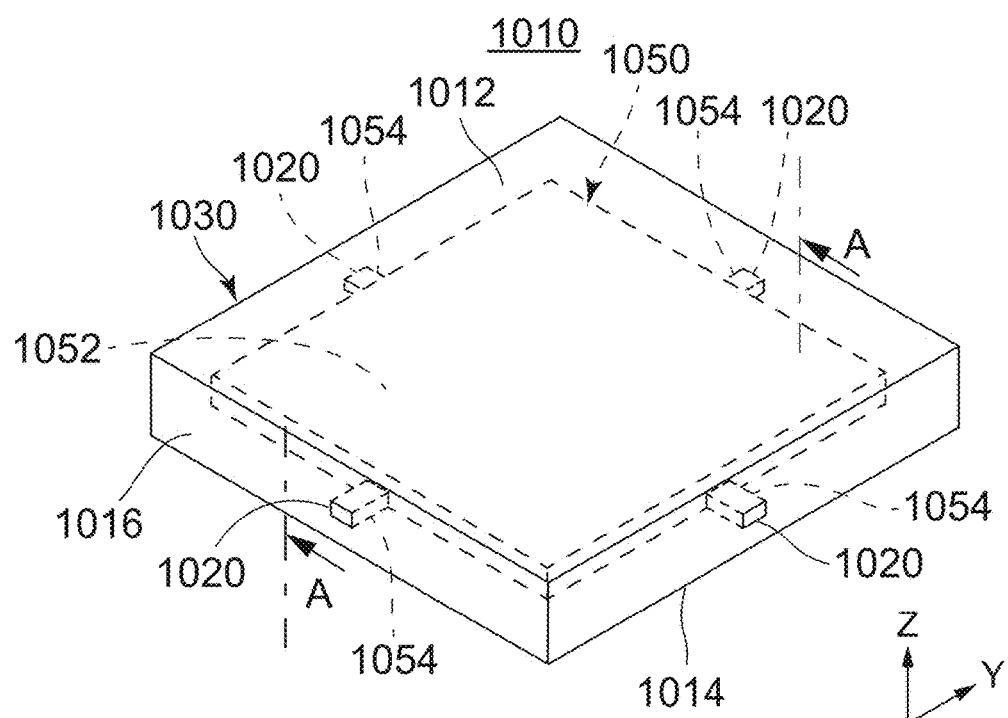
FIG. 7 is a perspective view showing a laminated substrate according to a second embodiment of the present invention. A magnetic member embedded in the laminated substrate is drawn by broken lines.

Referring to FIG. 7, a laminated substrate 1010 according to a second embodiment of the present invention is provided with a main member 1030 and a magnetic member 1050. The main member 1030 surrounds the magnetic member 1050 and forms an outer surface of the laminated substrate 1010 except for specific areas 1020. The magnetic member 1050 is embedded in the laminated substrate 1010 and exposed only in the specific areas 1020. The laminated substrate 1010 has a pair of principle surfaces 1012 and 1014 and an end face 1016 connecting the principle surfaces 1012 and 1014 to each other. A plurality of the specific areas 1020 is provided on the end face 1016 of the laminated substrate 1010. Each of the specific areas 1020 is surrounded by the main member 1030 on the end face 1016.

As understood from FIG. 7, in the present embodiment, a shape of the laminated substrate 1010 is a square when viewed along the up-down direction. In other words, in the present embodiment, a shape of each of the principle surfaces 1012 and 1014 of the laminated substrate 1010 is a square. In the present embodiment, the up-down direction is a Z-direction which coincides with the laminating direction of the laminated substrate 1010. A positive Z-direction is directed upward while a negative Z-direction is directed downward. The end face 1016 consists of four flat surfaces (side surfaces). In other words, end faces of the laminated substrate 1010 are collectively referred as the end face 1016 in the present embodiment. The specific areas 1020 are individually provided to the four side surfaces. However, the present invention is not limited thereto. The laminated substrate 1010 may adopt another shape according to an intended use thereof. For example, the laminated substrate 1010 may have a shape of a polygon (other than a square), a rounded polygon, a circle or an ellipse when viewed along the up-down direction. It is sufficient that at least one specific area 1020 is provided on a part of the end face 1016. The specific areas 1020 may be optionally set in number, position, shape and size. However, the specific areas 1020 are preferably located apart from corner or edge portions of the laminated substrate 1010. Furthermore, it is sufficient that an area of the specific areas 1020 has a size enough to flow gas generated in the magnetic member 1050 and residual gas in the laminated substrate 1010 outside. The area of the specific regions 1020 is as small as possible preferably. These are for preventing the magnetic member 1050 from crumbling from the specific areas 1020.

As shown in FIG. 7, in the present embodiment, the magnetic member 1050 has a main body portion 1052 and extension portions 1054. A shape of the main body portion 1052 is similar to that of the laminated substrate 1010. In other words, the shape of the main body portion 1052 is a square in the present embodiment when viewed along the up-down direction. The main body portion 1052 is located inside the laminated substrate 1010 and apart from the end face 1016 of the laminated substrate 1010. The extension portions 1054 extend from four side surfaces of the main body portion 1052 to the side surfaces (the end face 1016) of the laminated substrate 1010 which correspond to the side surfaces of the main body portion 1052, respectively. Tips of the extension portions 1054 are reached to the side surfaces of the laminated substrate 1010 and exposed in the specific areas 1020, respectively, which are parts of the end face 1016. However, the present invention is not limited thereto. For example, the magnetic member 1050 may have a shape in which the main body portion 1052 and the extension portions 1054 cannot be clearly distinguished from each other.

Figure 8:
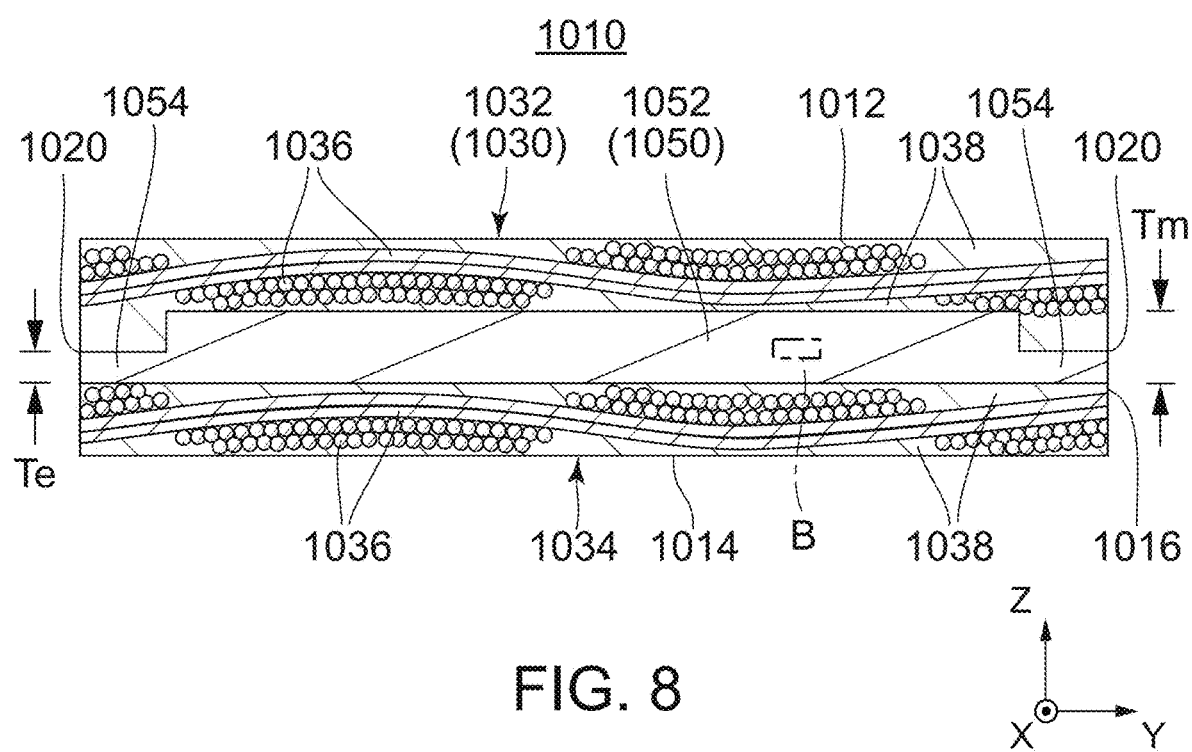
FIG. 8 is a cross-sectional view showing the laminated substrate of FIG. 7, taken along line A-A.

As understood from FIGS. 7 and 8, in the present embodiment, each of the extension portions 1054 of the magnetic member 1050 is smaller than the main body portion 1052 when viewed along an its extending direction. In other words, the size of each of the specific areas 1020 is smaller than that of the main body portion 1052 in each of the up-down direction and a direction perpendicular thereto (an X-direction or a Y-direction). However, the present invention is not limited thereto. In the up-down direction, the size of the specific areas 1020 may be the same as that of the main body portion 1052 of the magnetic member 1050. Nevertheless, in order to prevent the magnetic member 1050 from crumbling as mentioned above, the size of the specific areas 1020 is smaller than that of the main body portion 1052 of the magnetic member 1050 preferably in the up-down direction.

Referring to FIG. 8, the main member 1030 is provided with an upper prepreg cured body 1032 and a lower prepreg cured body 1034. The upper prepreg cured body 1032 and the lower prepreg cured body 1034 have the same structure substantially. In detail, each of the upper prepreg cured body 1032 and the lower prepreg cured body 1034 has a fibrous reinforcement base 1036 impregnated with a thermosetting resin composition 1038. In the present embodiment, the fibrous reinforcement base 1036 consists of glass woven fabric. The thermosetting resin composition 1038 includes epoxy resin as a chief ingredient. However, the present invention is not limited thereto. The fibrous reinforcement base 1036 may be glass nonwoven fabric. Alternatively, the fibrous reinforcement base 1036 may be woven fabric or nonwoven fabric made of material other than glass.

Figure 9:
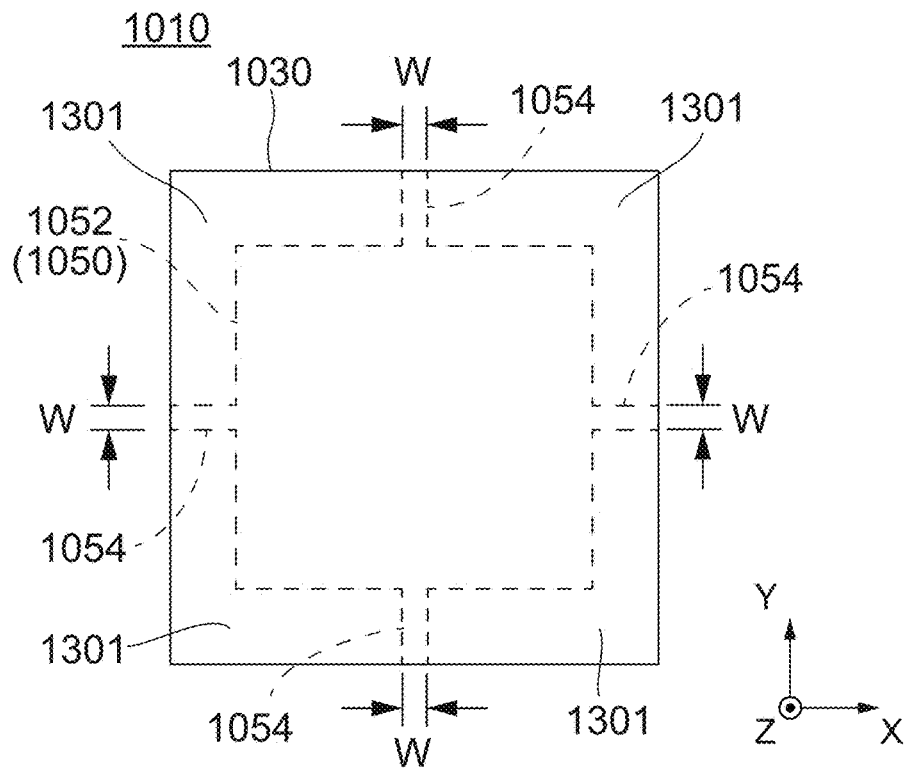
FIG. 9 is a plan view showing the laminated substrate of FIG. 7. The magnetic member embedded in the laminated substrate is shown by broken lines.

As understood form FIG. 9, when seen through the laminated substrate 1010 along the up-down direction, the laminated substrate 1010 has a plurality of areas (coupling areas 1301) in which the magnetic member 1050 does not exist. Between two of the coupling areas 1301 adjacent to each other, the extension portion 1054 and the specific area are located. In each of the coupling areas 1301, the upper prepreg cured body 1032 (see FIG. 8) and the lower prepreg cured body 1034 (see FIG. 8) are directly coupled to each other to be unified. Consequently, each of upper prepreg cured body 1032 and the lower prepreg cured body 1034 is prevented from peeling off from the magnetic member 1050. In order to obtain a predetermined coupling force between the upper prepreg cured body 1032 and the lower prepreg cured body 1034, each of the coupling areas 1301 has desirably an area of 0.0025 mm$^2$ or more. Moreover, a shortest interval between adjacent two of the coupling areas 1301 is 5 mm or less desirably. In the present embodiment, the shortest interval of the adjacent two of the coupling areas 1301 is equal to a width W of the extension portions 1054 of the magnetic member 1050. Here, the width W of the extension portion 1054 of the magnetic member 1050 is a size in a direction (the X-direction or the Y-direction) which is perpendicular to the up-down direction and parallel with the side surface (the end face 1016) of the laminated substrate 1010 that corresponds thereto.

Figure 10:
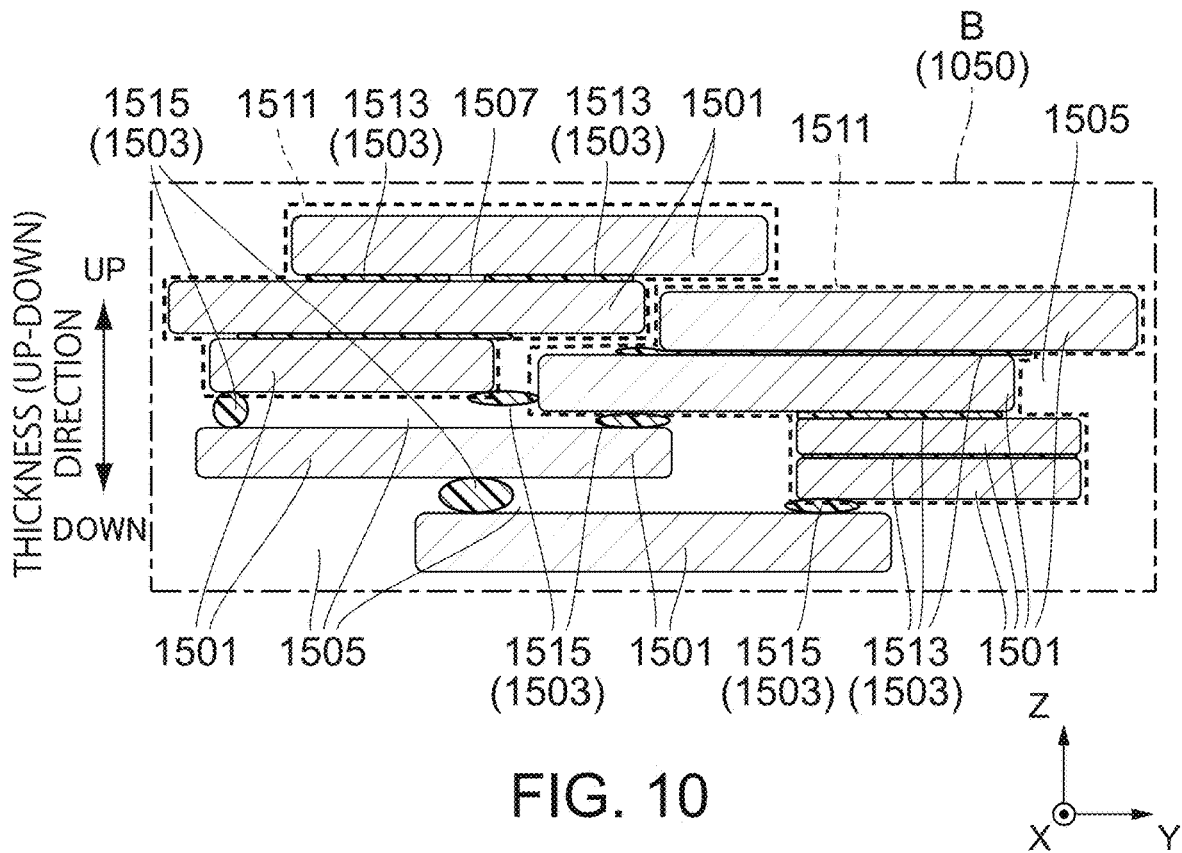
FIG. 10 is an enlarged view showing a part of the laminated substrate of FIG. 8, wherein the part is surrounded by a frame B.
Figure 11:
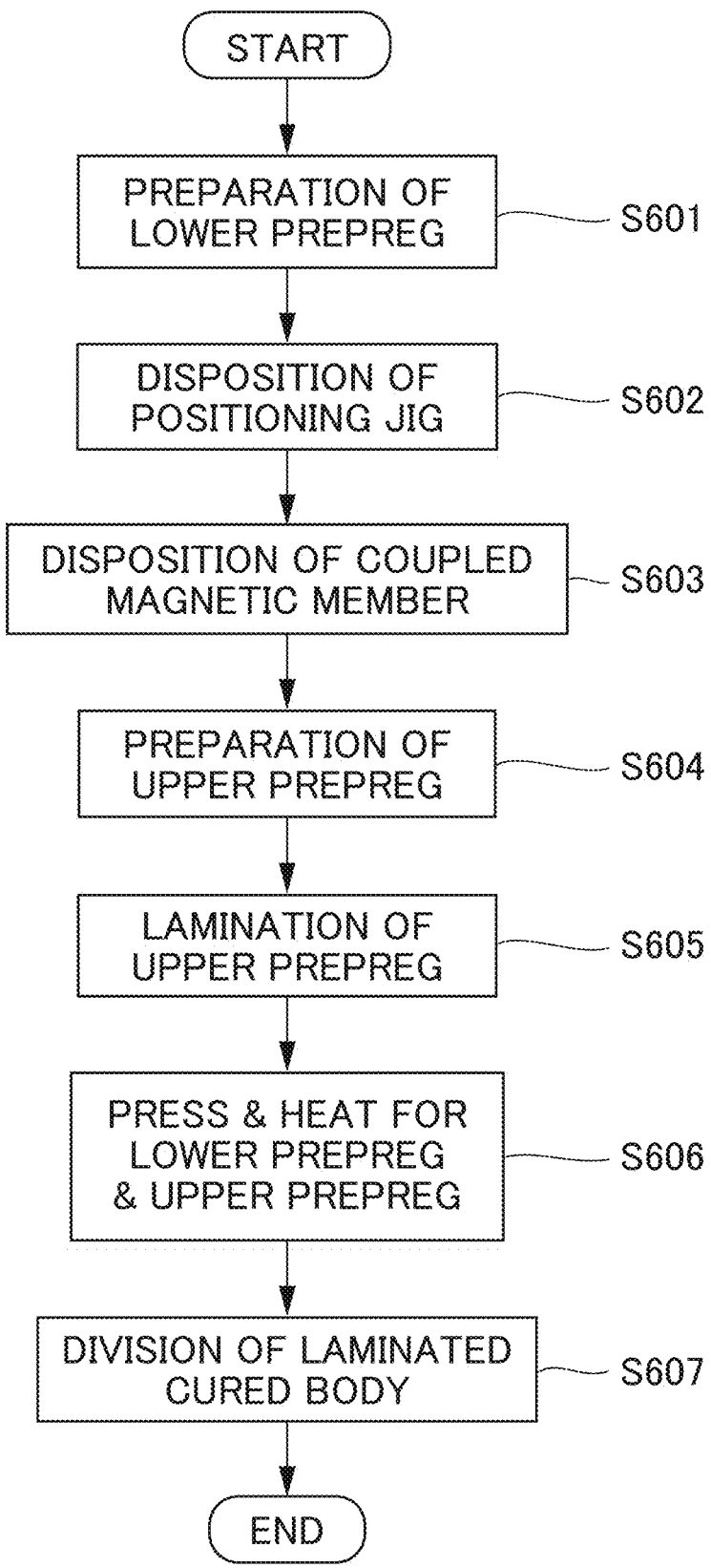
FIG. 11 is a flowchart for describing a method for manufacturing the laminated substrate of FIG. 7.

As understood form FIG. 10, the magnetic member 1050 is formed similarly to the magnetic member 30 of the first embodiment. As shown in FIG. 10, the magnetic member 1050 is formed by binding soft magnetic metal powder 1501 using a binder 1503. The soft magnetic metal powder 1501 consists of particles each of which has a flat shape thin in the up-down direction. The particles are roughly oriented in a direction (in-plane direction) perpendicular to the up-down direction. The binder 1503 has inorganic oxide, e.g. silicon oxide, as a chief ingredient.

In the present embodiment, the magnetic member 1050 includes the soft magnetic metal powder 1501 of 60 vol. % and or more and open pores 1505 of 10 vol. % or more and 30 vol. % or less. The open pores 1505 are pores which are opened outside the laminated substrate 1010. Existence of the open pores 1505 allows the gas generated in the magnetic member 1050 and the residual gas in the laminated substrate 1010 to flow outside. Accordingly, in a case where the laminated substrate 1010 is heat treated, the laminated substrate 1010 is not damaged by thermal expansion of the gas generated therein and the residual gas left therein. The magnetic member 1050 further includes closed pores 1507 of a few vol. %. The closed pores 1507 are cavities which are not opened outside the laminated substrate 1010. However, the content of the closed pores 1507 is small. Accordingly, the laminated substrate 1010 is not damaged by thermal expansion of the residual gas left in the closed pores 1507 even if it is heat treated.

As shown in FIG. 10, the soft magnetic metal powder 1501 forms one or more powder aggregates 1511. Each of the powder aggregates 1511 includes a plurality of particles of the soft magnetic metal powder 1501. In each of the powder aggregates 1511, each of the particles of the soft magnetic metal powder 1501 overlaps with at least one of other particles of the soft magnetic metal powder 1501 in the up-down direction. In each of the powder aggregates 1511, the particles of the soft magnetic metal powder 1501 that are overlapped with each other are displaced from each other in the in-plane direction. In each of the powder aggregates 1511, the particles of the soft magnetic metal powder 1501 that are overlapped with each other in the up-down direction are bound by first binding bodies 1513. The powder aggregates 1511 adjacent to each other in the up-down direction are bound by second binding bodies 1515. Also, the powder aggregates 1511 adjacent to each other in the in-plane direction are bound by other second binding bodies 1515. Each of the particles of the soft magnetic metal powder 1501 that does not form the powder aggregates 1511 is bound, by another second binding body 1515, to the powder aggregate 1511 adjacent thereto or another particle which does not form the powder aggregates 1511. Here, the first binding bodies 1513 and the second binding bodies 1515 are binder components obtained by hot curing the binder 1503. Each of the first binding bodies 1513 spreads flat along a surface of the particle of the soft magnetic metal powder 1501. Each of the second binding bodies 1515 is solidified in a particle shape.

As understood from FIG. 10, each of the first binding bodies 1513 is remarkably thin in comparison with the particle of the soft magnetic metal powder 1501 in the up-down direction. Consequently, the particles of the soft magnetic metal powder 1501 forming the powder aggregate 1511 are gathered in high density. With this, the magnetic member 1050 can include the soft magnetic metal powder 1501 of 60 vol. % or more. On the other hand, each of the second binding bodies 1515 has a relatively large size in each of the up-down direction and the in-plane direction. Hence, the second binding body 1515 forms a relatively large gap between the powder aggregates 1511 adjacent to each other. Alternatively, the second binding body 1515 forms a relatively large gap between the particle of the soft magnetic metal powder 1501 that does not form the powder aggregate 1511 and another nearby one of the particles of the soft magnetic metal powder 1501 or nearby one of the powder aggregates 1511. Most of the gaps formed by the second binding bodies 1515 form the open pores 1505 which are opened outside the magnetic member 1050. The remains of the gaps formed by the second binding bodies 1515 form the closed pores 36 which are isolated individually. Existence of the open pores 1505 and the closed pores 1507 gives the magnetic member 1050 flexibility. In order to obtain desired flexibility, a volume percent of the open pores 1050 in the magnetic member 1050 is set to 10 vol. % or more.

In the present embodiment, the main body portion 1052 of the magnetic member 1050 has a thickness Tm (see FIG. 8) of 0.3 mm or less. The thickness Tm of the main body portion 1052 is 0.15 mm or less preferably. These are for the same reason as the magnetic member 30 of the first embodiment. In addition, the extension portions 1054 of the magnetic member 1050 have a thickness Te thinner than the thickness Tm of the main body portion 1052 as shown in FIG. 8. Since the thickness Te of the extension portions 1054 is thinner than the thickness Tm of the main body portion 1052, the upper and the lower prepreg cured bodies 1032 and 1034 can be effectively prevented from peeling off in a state that passage of the gas is ensured.

The magnetic member 1050 includes, as mentioned above, the soft magnetic metal powder 1501 of 60 vol. % or more. Consequently, the magnetic member 1050 shows excellent magnetic characteristics. In detail, the magnetic member 1050 has high saturation flux density of 0.5 T or more and high magnetic permeability comparable to that of ferrite. For example, at a frequency of 1 MHz or more, the magnetic member 1050 has a real part of relative magnetic permeability of 100 or more. In order to obtain higher relative magnetic permeability of the magnetic member 1050, the magnetic member 1050 more preferably includes the soft magnetic metal powder 1501 of 70 vol. % or more. In the magnetic member 1050, the volume percentage of the open pores 1505 is set to 30 vol. % or less so that the volume percentage of the soft magnetic metal powder 1501 is set to 60 vol. % or more.

Each of the particles of the soft magnetic metal powder 1501 has the flat shape and is oriented in the in-plane direction as mentioned above. Accordingly, the magnetic member 1050 has an axis of easy magnetization extending in the in-plane direction. In order to obtain a smaller demagnetizing coefficient of the in-plane direction and higher relative magnetic permeability of the magnetic member 1050, a mean aspect ratio of the particles of the soft magnetic metal powder 1501 is 10 or more preferably. Here, the mean aspect ratio represents a ratio of a mean long diameter of the particles of the soft magnetic metal powder 1501 to a mean maximum thickness of the particles of the soft magnetic metal powder 1501.

The soft magnetic metal powder 1501 is made of Fe-based alloy preferably so as to obtain desired magnetic characteristics. In detail, the soft magnetic metal powder 1501 is made of Fe—Si-based alloy preferably. In more detail, the soft magnetic metal powder 1501 is made of Fe—Si—Al-based alloy (Sendust) or Fe—Si—Cr-based alloy preferably.

In a case where the soft magnetic metal powder 1501 includes Si elements and Al elements, a ratio of the Si elements in the soft magnetic metal powder 1501 is 3 weight % or more and 18 weight % or less preferably while a ratio of the Al elements in the soft magnetic metal powder 1501 is 1 weight % or more and 12 weight % or less preferably. When the soft magnetic metal powder 1501 has the composition mentioned above, the magnetic member 1050 has a lower crystal magnetic anisotropic constant, a lower magnetostriction constant and excellent magnetic characteristics.

The particles of the soft magnetic metal powder 1501 are bound by the binder components 1513 and 1515 which are inorganic substances as mentioned above. Accordingly, the magnetic member 1050 can be resistant to a high temperature of about 260 degrees Celsius used for reflow soldering. Moreover, the particles of the soft magnetic metal powder 1501 are bound by the binder components 1513 and 1515 which have electric insulation. Accordingly, the magnetic member 1050 has excellent frequency characteristics and high electric resistivity of 10 kΩcm or more. Thus, the magnetic member 1050 has good electric insulation. In a case where the soft magnetic metal powder 1501 includes predetermined amount of the Si elements and the Al elements, passivity films including Si elements and Al elements are formed on surfaces of particles of the soft magnetic metal powder 1501 during a manufacturing process of the magnetic member 1050. Accordingly, the magnetic member 1050 has higher electric resistivity.

The binder components 1513 and 1515 included in the magnetic member 1050 have a preferable range of a volume percentage, and the preferable range depends on density of the binder components 1513 and 1515. The density of the binder components 1513 and 1515 is varied according amount of the closed pores 36. For example, when the density of the binder components 1513 and 1515 is 1.3 g/cc or more and 2.2 g/cc or less, the preferable range of the volume percentage of the binder components 1513 and 1515 included in the magnetic member 1050 is 4 vol. % or more and 30 vol. % or less. When the volume percentage of the binder components 1513 and 1515 is smaller than 4 vol. %, the magnetic member 1050 does not enough strength. When the volume percentage of the binder components 1513 and 1515 is larger than 30 vol. %, it is impossible to realize a state that the volume percentage of the soft magnetic metal powder 1501 is 60 vol. % or more and the volume percentage of the open pores 1505 is 10 vol. % or more.

Referring to FIGS. 11 to 14, a manufacturing method for manufacturing the laminated substrate 1010 of FIG. 7 is described in the following. First, a lower prepreg 1341 is provided (Step S601). The lower prepreg 1341 is changed into the lower prepreg cured body 1034 (see FIG. 8) by a pressing and heating process (Step S606) curried out later. In detail, the lower prepreg 1341 has a sheet shape and includes the fibrous reinforcement base 1036 (see FIG. 8) impregnated with the thermosetting resin composition 1038 (see FIG. 8). A surface of the lower prepreg 1341 is generally flat and not provided with an accommodating portion, such as a cavity or a frame body, for accommodating the magnetic member 1050 (see FIG. 7). The thermosetting resin composition 1038 is in a half-cured state (stage B), and the lower prepreg 1341 has flexibility. A thickness of the lower prepreg 1341 and composition of the thermosetting resin composition 1038 are selected to realize a predetermined bending radius R in a state that the lower prepreg 1341 is changed into the lower prepreg cured body 1034.

For example, the thickness of the lower prepreg 1341 is 100 μm or less. A size of the lower prepreg 1341 in the in-plan direction is enough to arrange a predetermined number of the magnetic members 1050 thereon.

Figure 12:
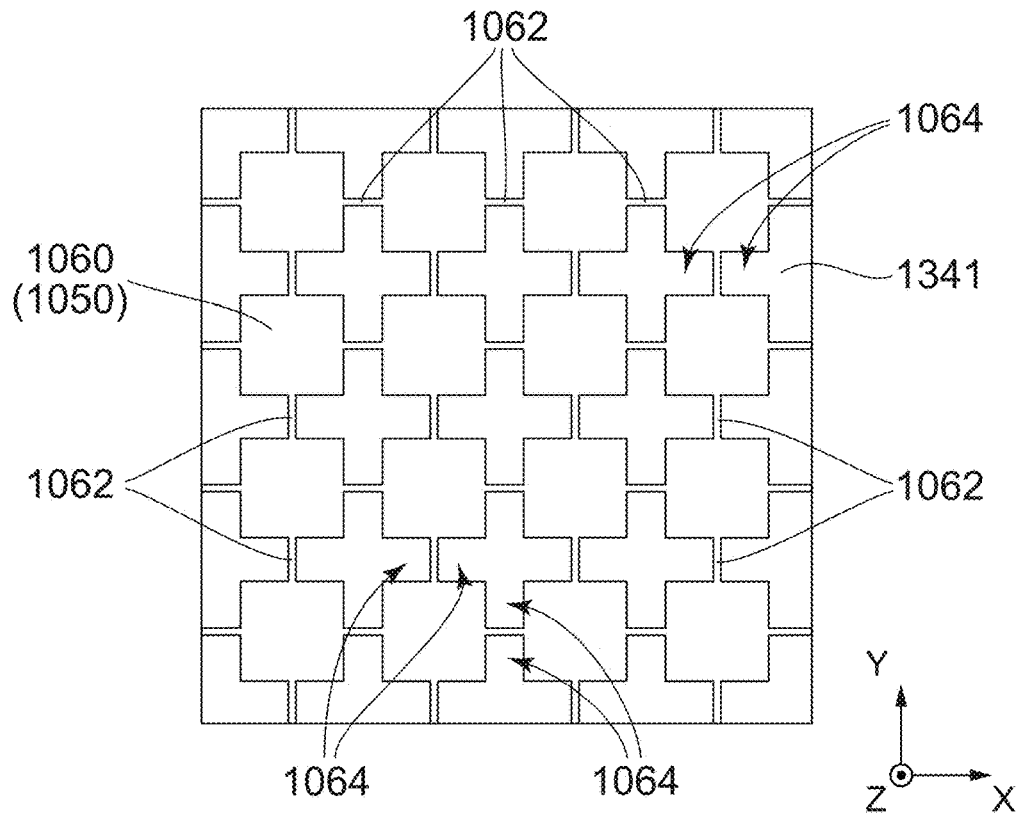
FIG. 12 is a plan view showing one state in the middle of manufacturing the laminated substrate of FIG. 7.
Figure 13:
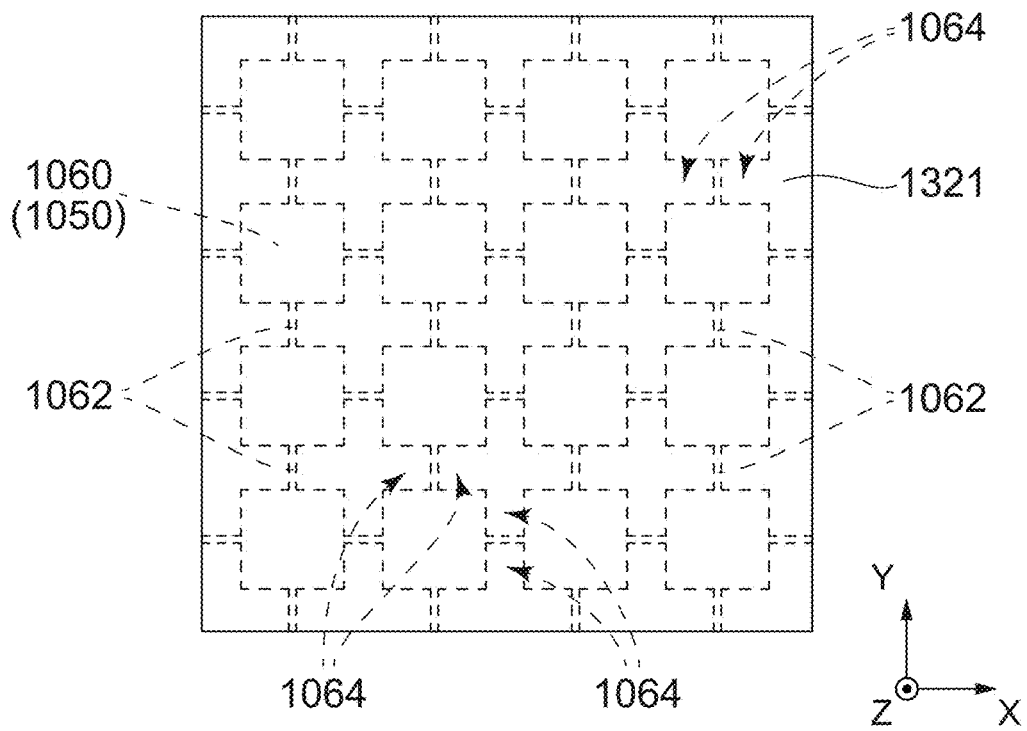
FIG. 13 is a plan view showing a laminated body formed from the state of FIG. 12. A coupled magnetic member is shown by broken lines.

Next, a positioning jig (not shown) is disposed on a surface of the lower prepreg 1341 to arrange the magnetic members 1050 (Step S602). Subsequently, using the positioning jig, as shown in FIG. 12, a coupled magnetic member 1060 is disposed on the surface of the lower prepreg 1341 (Step S603). The coupled magnetic member 1060 consists of a plurality of the magnetic members 1050 coupled with one another. Adjacent two of the magnetic members 1050 are coupled with each other by one coupled portion 1062 and separated by two separation spaces 1064. However, the present invention is not limited thereto. The adjacent two of the magnetic members 1050 may be separated by at least one separation space 1064. Nevertheless, in order not to position the extension portion 1054 at the corner portions of the laminated substrate 1010, at least two separation spaces 1064 are necessary between the adjacent two of the magnetic members 1050.

Next, an upper prepreg 1321 is provided (Step S604). The upper prepreg 1321 is changed into the upper prepreg cured body 1032 (see FIG. 8) by the pressing and heating process curried out later. The upper prepreg 1321 has the same structure as that of the lower prepreg 1341.

Next, the upper prepreg 1321 is laminated on the lower prepreg 1341 on which the coupled magnetic member 1060 is disposed (see FIG. 13), and the coupled magnetic member 1060 is sandwiched between the lower prepreg 1341 and the upper prepreg 1321 (Step S605). In this manner, a laminated body in which the upper prepreg 1321 and the lower prepreg 1341 are arranged on upper and lower surfaces of the coupled magnetic member 1060, respectively, is obtained.

Next, the laminated body is heated over a temperature at which the thermosetting resin composition 1038 (see FIG. 8) is cured while a pressure is applied to the laminated body from above and below (Step S605). The pressing and heating for the laminated body may be carried out by a hot press device or an autoclave. In the heating process, the thermosetting resin composition 1038 is temporarily fused and then cured (stage C). In the meantime, by influence of the pressing, the thermosetting resin composition 1038 fused flows into and fills between the upper prepreg 1321 and the coupled magnetic member 1060 and between the lower prepreg 1341 and the coupled magnetic member 1060. Moreover, the upper prepreg 1321 and the lower prepreg 1341 (see FIG. 12) directly come into contact with each other in each of the separation spaces 1064, and a boundary therebetween disappear. While this state is maintained, the thermosetting resin composition 1038 is cured. Thus, the upper prepreg 1321 and the lower prepreg 1341 are respectively changed into the upper prepreg cured body 1032 and the lower prepreg cured body 1034 to form a cured laminated body. In each of the separation spaces 1064, the upper prepreg cured body 1032 and the lower prepreg cured body 1034 are directly coupled with each other and unified. In the pressing and heating process, the magnetic member 1050 has a shrinkage of about 0.1%. Accordingly, a high dimensional accuracy of the cured laminated body can be achieved. Moreover, since the magnetic member 1050 has the flexibility, it is not broken physically in the pressing and heating process. Furthermore, the magnetic characteristics of the magnetic member 1050 are not deteriorated in the pressing and heating process.

Figure 14:
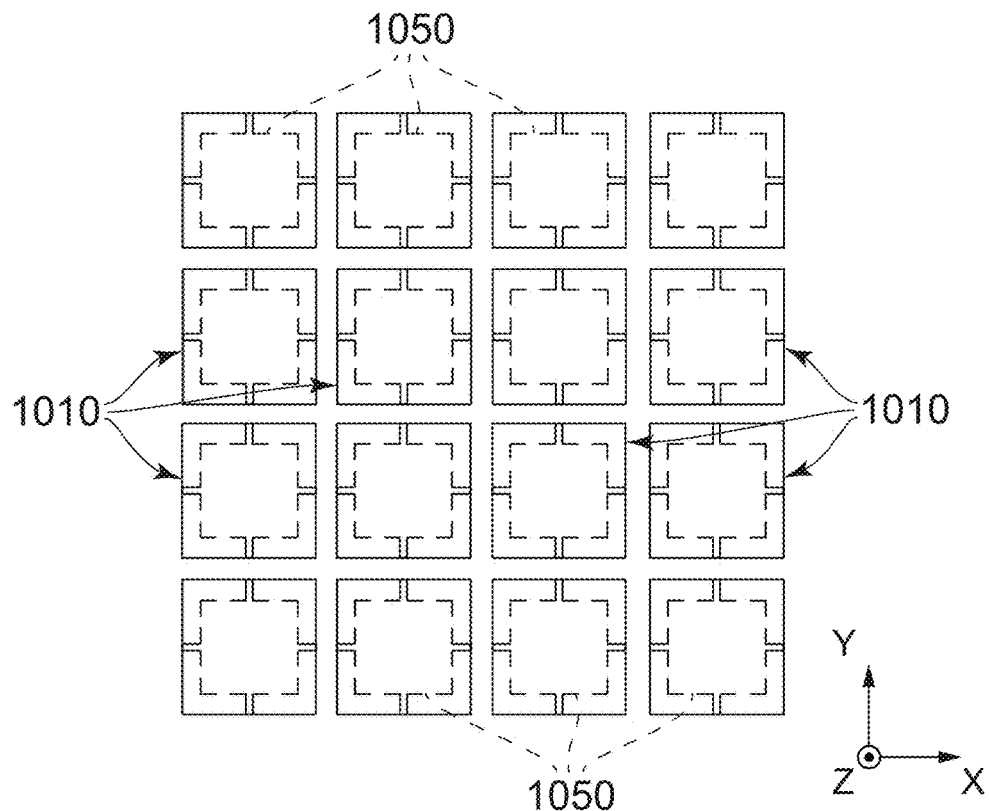
FIG. 14 is a plan view showing a plurality of laminated substrates obtained by dividing a cured laminated body which is formed by curing the laminated body of FIG. 13. Magnetic members are shown by broken lines.

Next, as shown in FIG. 14, the cured laminated body is divided into the laminated substrates 1010 each of which has the magnetic member 1050 embedded therein (Step S607). This dividing process may be carried out by a punching process. The punching process can divide the cured laminated body into a plurality of the laminated substrates 1010 at once. The dividing process is carried out so that adjacent two of the magnetic members 1050 are divided along an imaginary dividing line (not shown) which passes through the separation spaces 1064 (see FIG. 13) between the adjacent two of the magnetic members 1050. In the present embodiment, the dividing process is carried out so that the coupled portion 1062 (see FIG. 13) located between two of the separation spaces 1064 is divided into two in an extending direction of the coupled portion 1062. The coupled portion 1062 is divided into two each of which become the extension portion 1054 (see FIG. 7). Each of the separation spaces 1064 is divided into two each of which become the coupling area (separation area) 1301. Thus, by dividing the cured laminated body along the imaginary dividing lines passing through the separation spaces 1064, the laminated substrate 1010 in which the magnetic member 1050 is partly exposed only in the specific areas 1020 (see FIG. 7) of the end face 1016 of the laminated substrate 1010 can be obtained.

According to the aforementioned manufacturing method of the laminated substrate 1010, there is no need to provide a cavity for accommodating the magnetic member 1050. Accordingly, the number of manufacturing steps and manufacturing costs can be reduced. Moreover, the coupled magnetic member 1060 in which the magnetic members 1050 are coupled to one another can be used in the manufacturing method. Accordingly, labor of handling the magnetic members 1050 separately can be saved.

Third Embodiment

Figure 15:
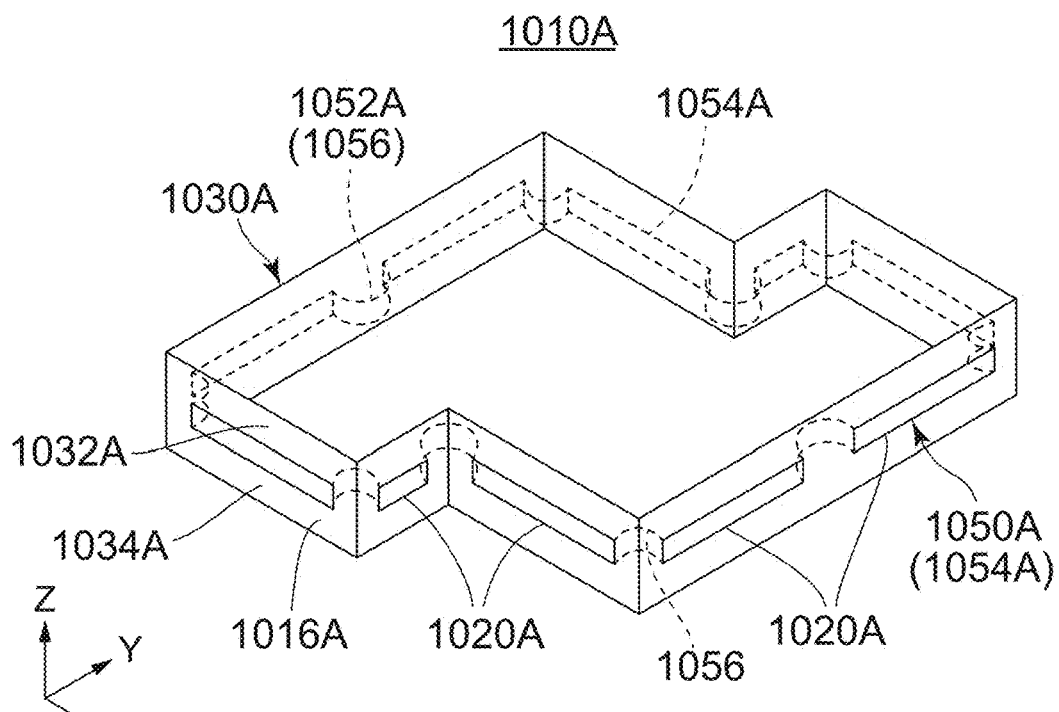
FIG. 15 is a perspective view showing a laminated substrate according to a third embodiment of the present invention. A magnetic member embedded in the laminated substrate is shown by broken lines.

Referring to FIG. 15, a laminated substrate 1010A according to a third embodiment of the present invention is provided with a main member 1030A and a magnetic member 1050A. The dissimilarities between the laminated substrate 1010A according to the present embodiment and the laminated substrate 1010 according to the second embodiment are their shapes and shapes of the magnetic members 1050 and 1050A. Other points other than the points mentioned above are common between the laminated substrate 1010A according to the present embodiment and the laminated substrate 1010 according to the second embodiment, and the description of them will be omitted.

Figure 16:
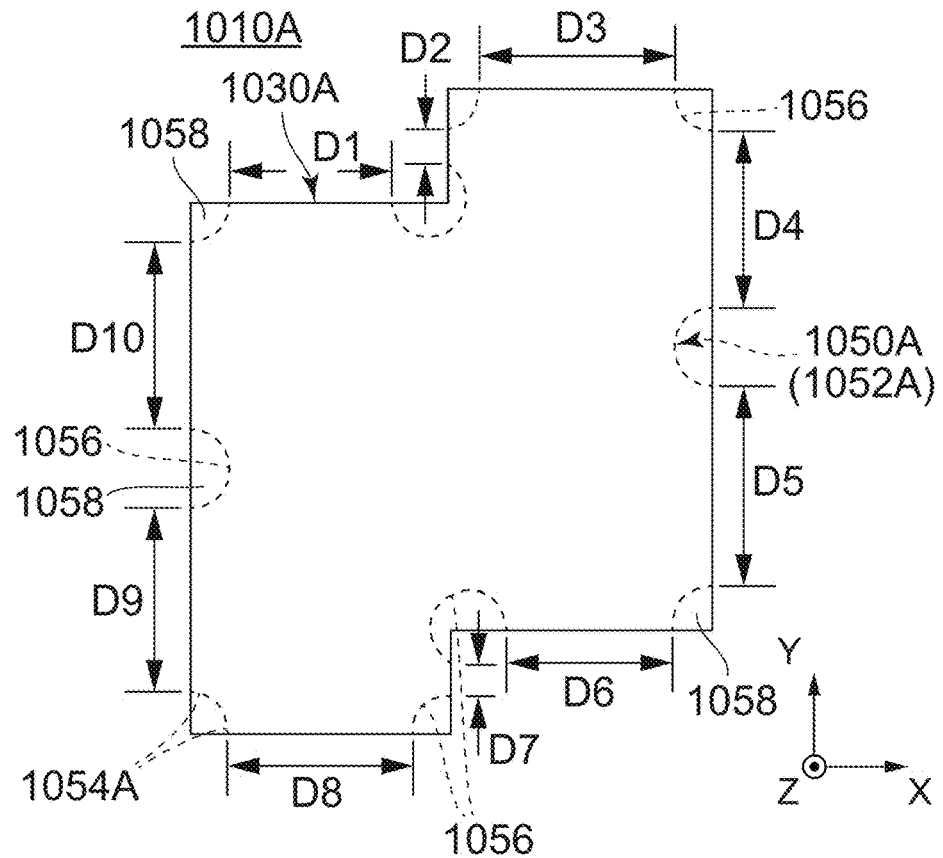
FIG. 16 is a plan view showing the laminated substrate of FIG. 15. A magnetic member embedded in the laminated substrate of FIG. 16 is shown by broken lines.

As shown in FIGS. 15 and 16, the laminated substrate 1010A has an octagonal shape like that two rectangles are shifted along one direction and combined with each other when viewed along the up-down direction. As understood from FIGS. 15 and 16, the magnetic member 1050A has the shape in which a main body portion 1052A and extension portions 1054A cannot be clearly distinguished from each other. The magnetic member 1050A is formed with a plurality of notch portions 1056. A part of the laminated substrate 1010A that is located between adjacent two of the notch portions 1056 along an end face 1016A forms the extension portion 1054A. As shown in FIG. 16, some of the notch portions 1056 are formed at corner portions of the laminated substrate 1010A when the laminated substrate 1010A is viewed along the up-down direction. Each of the others of the notch portions 1056 is formed in the middle of any one of sides of the laminated substrate 1010A so that each of intervals D1-D10 is smaller than a predetermined distance. In the present embodiment, the predetermined distance is 5 mm.

As shown in FIG. 15, the magnetic member 1050A is embedded in the laminated substrate 1010A and exposed only in the specific areas 1020A of the end face 1016A of the laminated substrate 1010A. The laminated substrate 1010A has a separation area 1058 outside each of the notch portions 1056 to be adjacent to the end face 1016A. In the separation area 1058, an upper prepreg cured body 1032A and a lower prepreg cured body 1034A are directly coupled with each other and unified. In order to obtain a predetermined coupling force between the upper prepreg cured body 1032A and the lower prepreg cured body 1034A, each of the separation areas 1058 has desirably an area of 0.0025 mm$^2$ or more when viewed along the up-down direction.

In the laminated substrate 1010A according to the present embodiment, the magnetic member 1050A is exposed partly. Accordingly, even if the laminated substrate 1010A is heat treated to expand gas existing therein, the gas is allowed to flow outside. Therefore, in a case where the laminated substrate 1010A is heat treated, the laminated substrate 1010A is not damaged by thermal expansion of gas generated therein and residual gas left therein.

Figure 17:
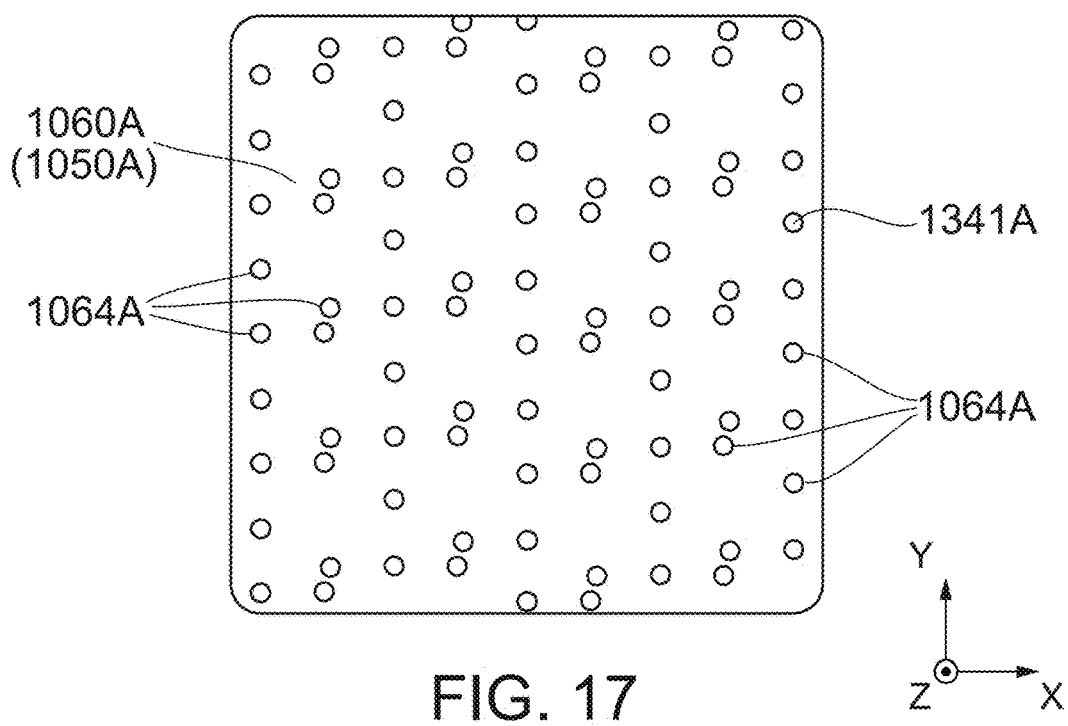
FIG. 17 is a plan view showing one state in the middle of manufacturing the laminated substrate of FIG. 15.
Figure 18:
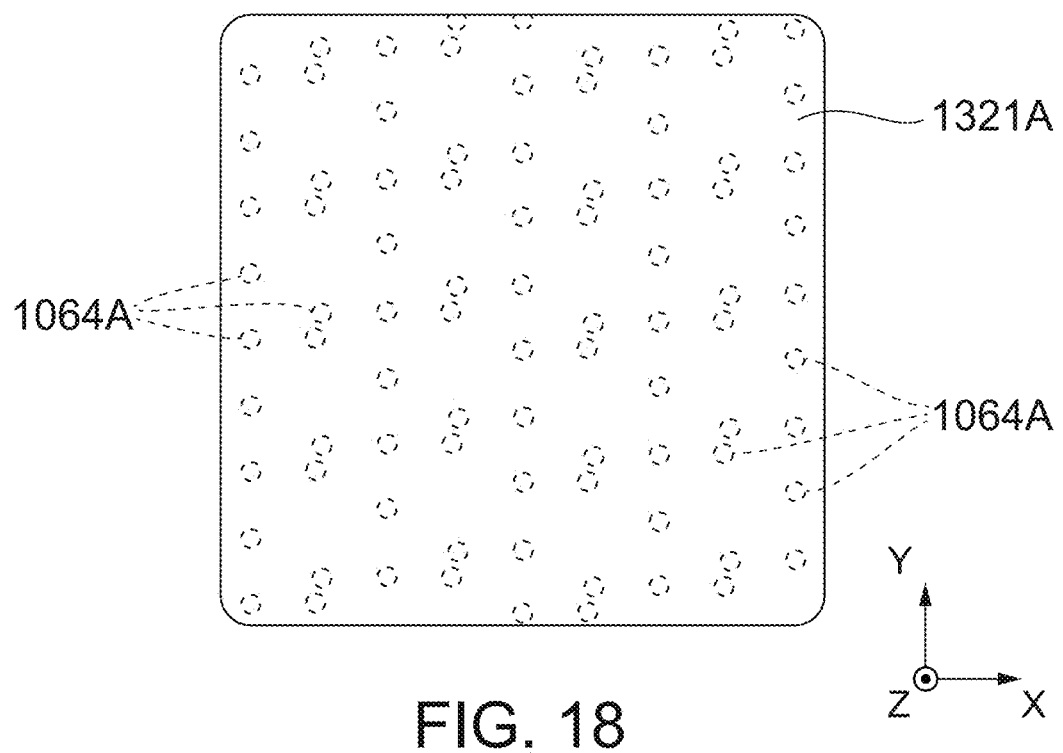
FIG. 18 is a plan view showing a laminated body formed from the state of FIG. 17. A coupled magnetic member is shown by broken lines.
Figure 19:
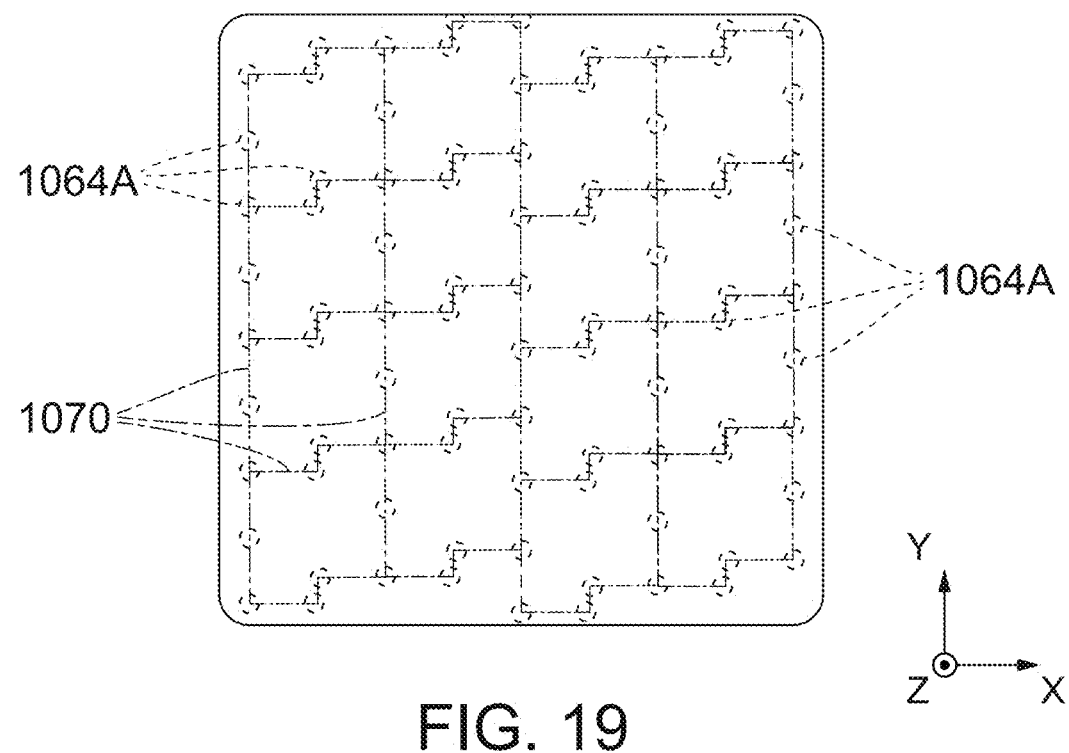
FIG. 19 is a plan view showing imaginary dividing lines for dividing a cured laminated body which is formed by curing the laminated body of FIG. 18.
Figure 20:
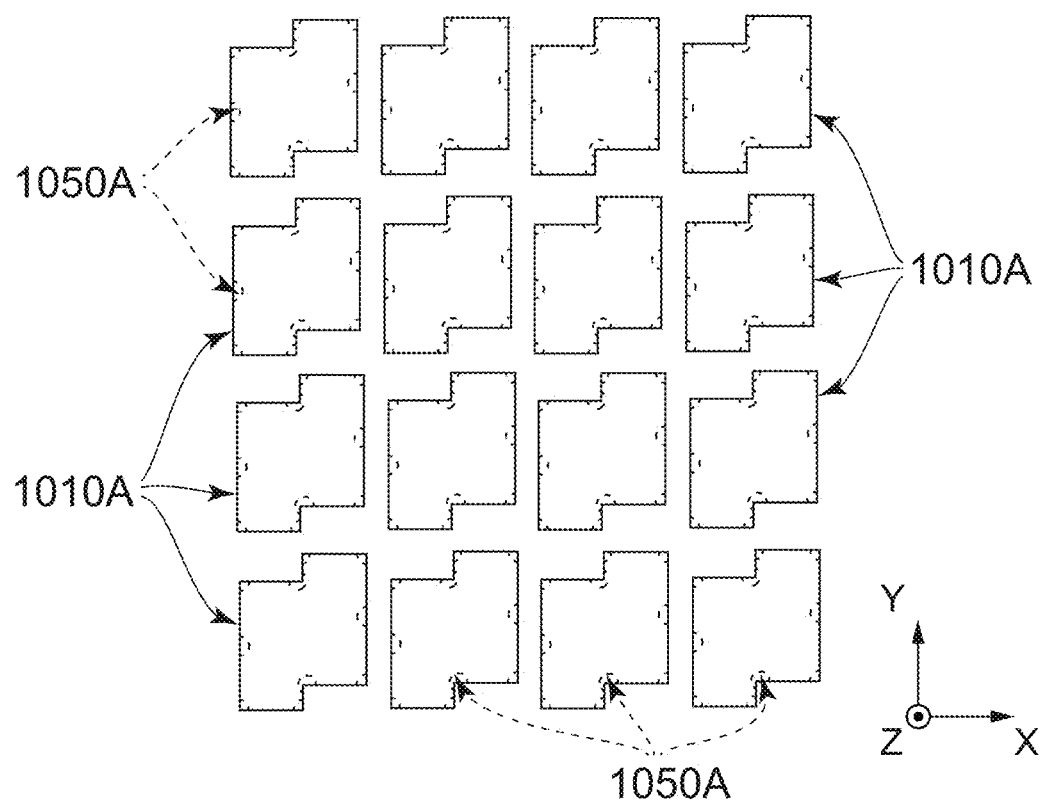
FIG. 20 is a plan view showing a plurality of laminated substrates obtained by dividing a cured laminated body along the imaginary dividing lines of FIG. 19. Magnetic members are shown by broken lines.

The laminated substrate 1010A according to the present embodiment may be manufactured by the same manufacturing method as that for the laminated substrate 1010 according to the second embodiment. Briefly, the laminated substrate 1010A is manufactured as the followings. First, as shown in FIG. 17, a coupled magnetic member 1060A in which a plurality of the magnetic member 1050A are coupled to one another is disposed on a surface of a lower prepreg 1341A. Next, as shown in FIG. 18, an upper prepreg 1321A is laminated on the lower prepreg 1341A on which the coupled magnetic member 1060A is disposed to form a laminated body. Then, the laminated body is pressed from above and below and heated so that the lower prepreg 1341A and the upper prepreg 1321A are cured to form a cured laminated body. Finally, the cured laminated body is divided along imaginary dividing lines 70 shown in FIG. 19 to obtain a plurality of the laminated substrates 1010A as shown in FIG. 20.

In the present embodiment, adjacent two of the magnetic members 1050A of the coupled magnetic member 1060A are continued to each other and partly separated by three or four separation spaces 1064A. The separation spaces 1064A are embedded by the upper prepreg cured body 1032A and the lower prepreg cured body 1034A. By dividing the cured laminated body along the imaginary dividing lines 1070 passing through the separation spaces 1064A, the laminated substrate 1010A in which the magnetic member 1050A is partly exposed only in the specific areas 1020A can be obtained.

Figure 21:
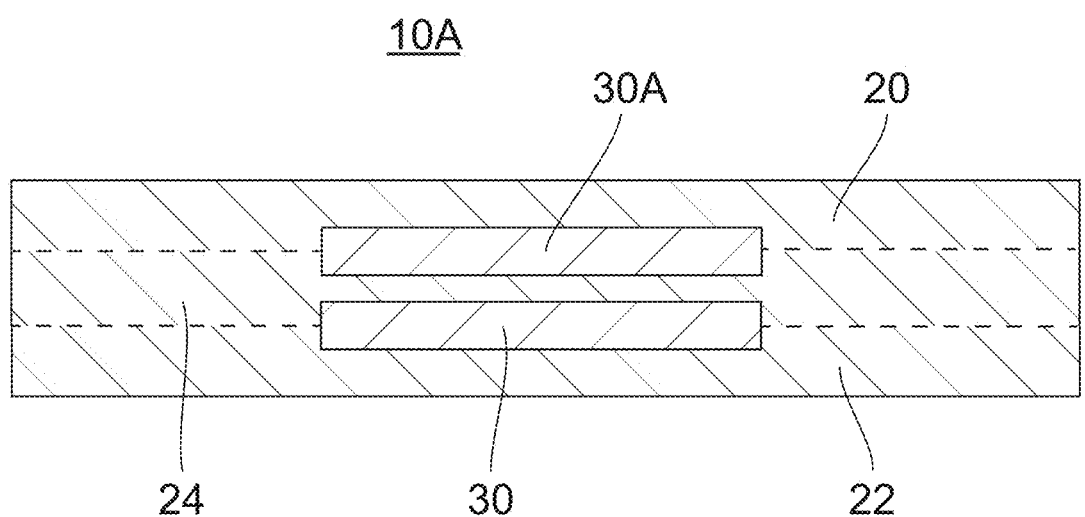
FIG. 21 is a schematically cross-sectional view showing a modified example of the laminated substrate according to the first embodiment of the present invention. Fiber glasses are omitted.

Although the specific explanation about the present invention is made above referring to the embodiments, the present invention is not limited thereto but susceptible of various modifications and alternative forms without departing from the spirit of the invention. For example, although the magnetic member 30 (1050, 1050A) of the laminated substrate 10 (1010, 1010A) is one in number in the up-down direction (laminating direction), one or more additional magnetic members may be further laminated. In that case, the additional magnetic member may be located between the upper prepreg cured body 20 (1032, 1032A) and the lower prepreg cured body 22 (1034, 1034A) in the up-down direction and may be laminated on the magnetic member 30 (1050, 1050A) directly or via an additional prepreg cured body. Referring to FIG. 21, a laminated substrate 10A of a modified example according to the first embodiment has an additional magnetic member 30A and an additional prepreg cured body 24. The additional magnetic member 30A may be formed similarly to the magnetic member 30 (1050, 1050A). The additional prepreg cured body 24 may be formed similarly to the upper prepreg cured body 20 (1032, 1032A) and the lower prepreg cured body 22 (1034, 1034A). According to the structure like this, the bending radius of 100 mm can be realized, and the magnetic characteristics can be improved by a total thickness of the magnetic member 30 and the additional magnetic member 30A being 0.3 mm or more. In particular, by laminating the magnetic member 30 and the additional magnetic member 30A each of which has a thickness of 0.15 mm or less, the magnetic characteristics can be improved, and the laminated substrate 10A can be formed into a roll shape having a smaller bending radius.

Although each of the upper prepreg 1321 (1321A) and the lower prepreg 1341 (1341A) is a square sheet shape in the second (third) embodiment, they may be a long sheet shape which can be wound in a roll shape. In other words, a plurality of laminated bodies each of which consists of the upper prepreg 1321 (1321A), the lower prepreg 1341 (1341A) and the coupled magnetic member 1060 (1060A) may be formed continuously using upper prepreg and lower prepreg each of which is long and wound in a roll shape.

While there has been described what is believed to be the preferred embodiment of the invention, those skilled in the art will recognize that other and further modifications may be made thereto without departing from the spirit of the invention, and it is intended to claim all such embodiments that fall within the true scope of the invention.

What is claimed is:

1. A laminated substrate having end faces and comprising:
   an upper prepreg cured body;
   a lower prepreg cured body; and
   a magnetic member,
   wherein:
   the magnetic member is sandwiched between the upper prepreg cured body and the lower prepreg cured body in an up-down direction;
   the upper prepreg cured body is directly coupled to the lower prepreg cured body, without piercing through the magnetic member, in a plurality of separation areas that are separated from each other;
   the separation areas are adjacent to the end faces of the laminated substrate;
   the magnetic member is formed by binding soft magnetic metal powder using a binder;
   the soft magnetic metal powder consists of particles each of which has a flat shape;
   the binder comprises inorganic oxide as a chief ingredient;
   the magnetic member includes the soft magnetic metal powder in an amount of at least 60 vol. % and open pores in an amount of 10 to 30 vol. %;
   the magnetic member has a thickness of not more than 0.3 mm;
   the upper prepreg cured body has a thickness of not more than 100 μm;
   the lower prepreg cured body has a thickness of not more than 100 μm; and
   the magnetic member is exposed from the laminated substrate only in at least one specific area which is a part of one of the end faces of the laminated substrate and which is located between two of the separation areas that are adjacent to each other.

2. The laminated substrate as recited in claim 1, wherein the one of the end faces is provided with a plurality of the specific areas.

3. The laminated substrate as recited in claim 1, wherein:
   the magnetic member has a main body portion located apart from the one of the end faces and an extension portion extending from the main body portion to the one of the end faces and to the specific area; and
   the specific area has a size smaller than that of the main body in a direction of a thickness of the laminated substrate.

4. The laminated substrate as recited in claim 1, wherein the plurality of separation areas, in which the upper prepreg cured body is directly coupled to the lower prepreg cured body, are only provided adjacent to the end faces of the laminated substrate.

* * * * *